US010936115B2

(12) United States Patent
Xu

(10) Patent No.: US 10,936,115 B2
(45) Date of Patent: *Mar. 2, 2021

(54) LARGE PCAP SCREEN WITH MULTIPLE TOUCH CONTROLLER ASICS WITH INTERLEAVED CONNECTIONS

(71) Applicant: Elo Touch Solutions, Inc., Milpitas, CA (US)

(72) Inventor: Yansun Xu, Mountain View, CA (US)

(73) Assignee: Elo Touch Solutions, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/705,614

(22) Filed: Dec. 6, 2019

(65) Prior Publication Data

US 2020/0110504 A1 Apr. 9, 2020

Related U.S. Application Data

(63) Continuation of application No. 15/874,510, filed on Jan. 18, 2018, now Pat. No. 10,503,312.

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01)

(58) Field of Classification Search
CPC ............................. G06F 3/0416; G06F 3/044
See application file for complete search history.

(56) References Cited

U.S. PATENT DOCUMENTS 9,377,905 B1  6/2016 Grivna et al.
9,660,646 B1  5/2017 Sauer et al.
(Continued)

FOREIGN PATENT DOCUMENTS

EP   2667287 A1  11/2013
EP   2869168 A1   5/2015
WO   WO 2017/201338 A1  11/2017

OTHER PUBLICATIONS

International Search Report and Written Opinion, dated Mar. 25, 2019, for PCT Appl. No. PCT/US2019/013937, 15 pages.

*Primary Examiner* — Michael Pervan
(74) *Attorney, Agent, or Firm* — Sterne, Kessler, Goldstein & Fox P.L.L.C.

(57) ABSTRACT

System, method, and computer program product embodiments are provided for a projected capacitive (PCAP) touch system that includes a touchscreen and two or more touch controller application-specific integrated circuits (ASICs) communicatively coupled to the touchscreen, where connections between receiver (and/or driver) circuits of the two or more touch controller ASICs and touchscreen electrodes are interleaved. The two or more touch controller ASICs do not exchange raw mutual capacitance or self capacitance data during a measurement frame. Further, a processor may be coupled to the two or more touch controller ASICs, and may determine final touch coordinates based on all subsets of coarse touch coordinate data from each of the two or more touch controller ASICs. Embodiments also include determining each subset of coarse touch coordinate data based on a shape of a touch rather than a two-dimensional square or rectangular region of the touchscreen.

20 Claims, 22 Drawing Sheets

(56) References Cited

U.S. PATENT DOCUMENTS

| | | |
|---|---|---|
| 9,740,352 B2 | 8/2017 | Ahsan et al. |
| 10,503,312 B2 | 12/2019 | Xu |
| 2010/0110040 A1 | 5/2010 | Kim et al. |
| 2010/0156811 A1 | 6/2010 | Long et al. |
| 2012/0056662 A1 | 3/2012 | Wilson et al. |
| 2013/0015906 A1 | 1/2013 | Yeh |
| 2013/0016051 A1 | 1/2013 | Yeh |
| 2016/0098111 A1 | 4/2016 | Tsukamoto et al. |
| 2016/0154531 A1 | 6/2016 | Wall |
| 2016/0202797 A1 | 7/2016 | Cordeiro et al. |
| 2016/0266679 A1 | 9/2016 | Shaliparnia et al. |
| 2017/0010706 A1 | 1/2017 | Cok |
| 2017/0046007 A1 | 2/2017 | Kitagawa et al. |
| 2017/0090616 A1 | 3/2017 | Ahsan et al. |
| 2017/0090644 A1 | 3/2017 | Yao et al. |
| 2017/0168629 A1 | 6/2017 | Lai et al. |
| 2018/0024665 A1 | 1/2018 | Kent et al. |
| 2018/0188863 A1 | 7/2018 | Yi et al. |
| 2019/0220131 A1 | 7/2019 | Xu |

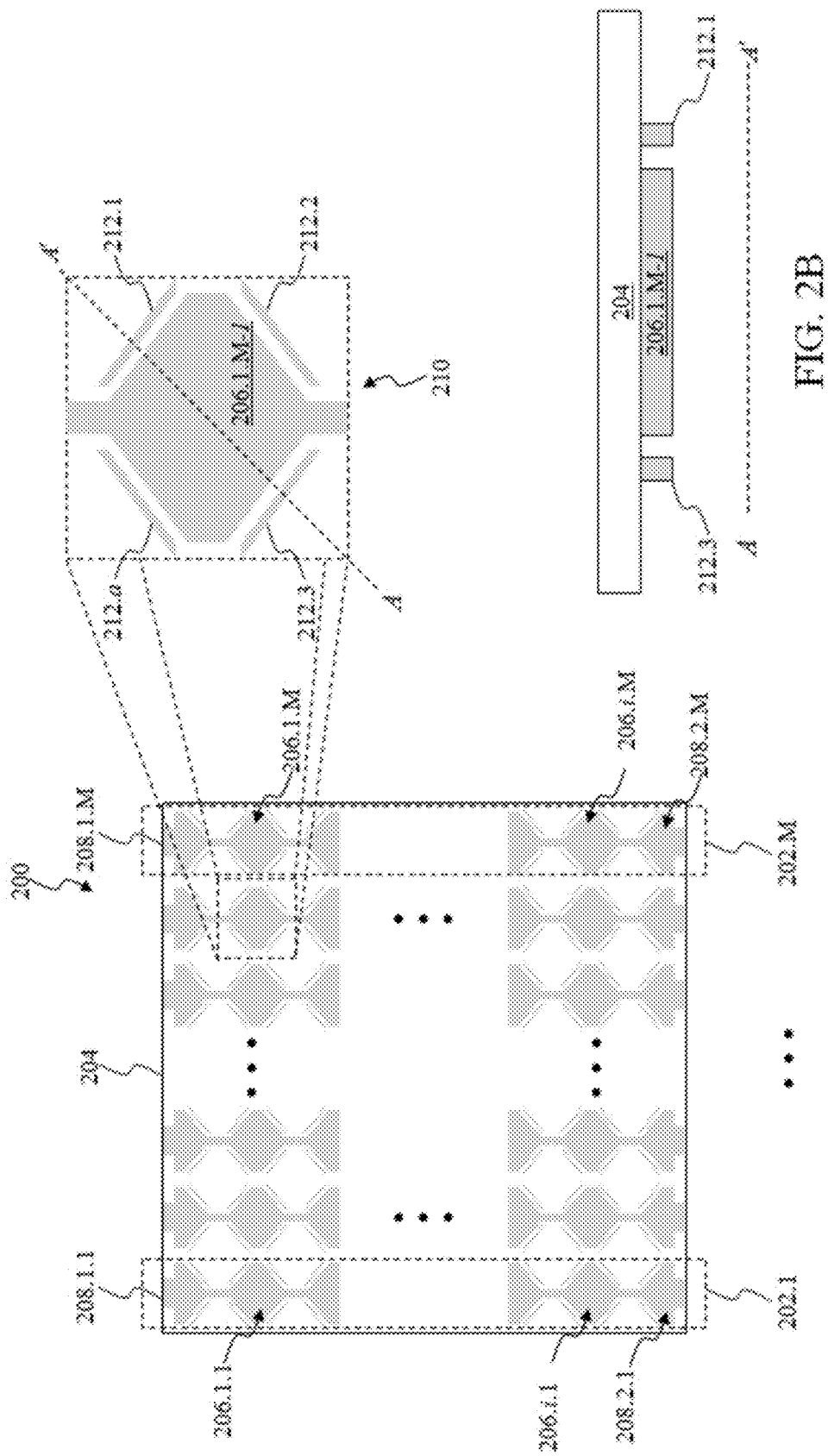

LARGE PCAP SCREEN WITH MULTIPLE TOUCH CONTROLLER ASICS WITH INTERLEAVED CONNECTIONS

CROSS-REFERENCE TO RELATED APPLICATION

This application is a continuation of U.S. patent application Ser. No. 15/874,510, filed on Jan. 18, 2018, entitled Large PCAP Screen with Multiple Touch Controller ASICs with Interleaved Receiver Connections, the contents of which are hereby incorporated by reference in its entirety.

BACKGROUND

Field

The present disclosure relates generally to touch sensitive systems, and more specifically to large scale display systems.

Background Art

The ability to interact with computer applications via touch with displays is ubiquitous for today's consumers. While several touch technologies are possible to support touch interactions, each has advantages and disadvantages that tailor each for particular environments, sizes, and applications. Projected capacitive (PCAP) technology is utilized to support characteristics expected from touch interactions in small screen devices such as handheld devices, e.g., smartphones, tablets, etc. Translating those characteristics for use with larger screens and applications faces challenges.

Large PCAP touchscreen systems that include multiple touch controller application-specific integrated circuits (ASICs) to support a large number of sensor electrodes result in increased cost and complexity to achieve acceptable response times and touch detection accuracy compared to smaller PCAP touchscreen systems with a single touch controller ASIC. Further, implementing a single touch controller ASIC that would provide enough sensor input/output (I/O) pins to cover the large number of sensor electrodes required for a large PCAP touchscreen in the same manner as a smaller PCAP touchscreen would be cost prohibitive.

SUMMARY

Large projected capacitive (PCAP) touchscreens that include multiple PCAP touch controller application-specific integrated circuits (ASICs) are computationally intensive. For example embodiments discussed herein, references of "ASIC" means a "PCAP touch controller ASIC," and "electrode" means "touchscreen electrode." When an ASIC of the multiple ASICs that cover a large PCAP touchscreen system, obtains raw touch signal data from a portion of the large PCAP touchscreen, a data processor needs to merge this ASIC's raw touch signal data with raw touch signal data from the remaining multiple ASICs before the final touch contact locations (e.g., (x,y) coordinates) are processed and derived for the large PCAP touchscreen. The exchanging and merging of the raw touch signal data among the multiple ASIC's can be computationally intensive.

Some embodiments include a PCAP touch system with a large PCAP touchscreen having a large number of electrodes and multiple ASICs that avoid the complexity of exchanging and/or merging the raw touch signal data among the multiple ASICs.

System, method, and computer program product embodiments are provided for a PCAP touch system that includes a touchscreen and two or more touch controller application-specific integrated circuits (ASICs) communicatively coupled to the touchscreen, to detect capacitive touch data from touchscreen electrodes, wherein each receiver circuit of the two or more touch controller ASICs connects to a selected portion of the touchscreen electrodes in an interleaved manner. In some embodiments, the two or more touch controller ASICs do not exchange raw mutual capacitance data during a measurement frame.

In some embodiments, the one or more processors are configured to: determine a final touch coordinate based on a first subset of coarse touch coordinate data from a first touch controller ASIC and a second subset of coarse touch coordinate data from a second touch controller ASIC. Each subset of coarse touch coordinate data from the first or second touch controller ASIC may be based at least on a number of horizontal and vertical electrode intersections whose mutual capacitance measurements satisfy a significant touch threshold. In addition, a first subset of touchscreen electrodes may be odd numbered and a second subset of touchscreen electrodes may be even numbered, wherein each subset of coarse touch coordinate data includes: a partial sum of mutual capacitance measurements satisfying a significant touch threshold across each subset of touchscreen electrodes; an X touch coordinate associated with each subset of touchscreen electrodes; and a Y touch coordinate associated with each subset of touchscreen electrodes, wherein the partial sum, X touch coordinate, and Y touch coordinate are calculated by each touch controller ASIC individually for one of the first subset or the second subset of touchscreen electrodes without communicating with the other touch controller ASIC.

In the PCAP touch system, a coarse pitch size of each subset of coarse touch coordinate data from one of the two or more touch controller ASICs may be based on a pitch size of the touchscreen and a number of the two or more touch controller ASICs. Some embodiments include third connections between driver circuits of the first touch controller ASIC and a third subset of touchscreen electrodes of the touchscreen, that are interleaved with fourth connections, wherein the fourth connections are between driver circuits of the second touch controller ASIC and a fourth subset of touchscreen electrodes of the touchscreen. The two or more touch controller ASICs may be configured to determine self-capacitance measurements.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 2A and FIG. 2B illustrate an exemplary first electrode pattern that can be used to implement the touchscreen according to an exemplary embodiment of the present disclosure;

Figure 1:
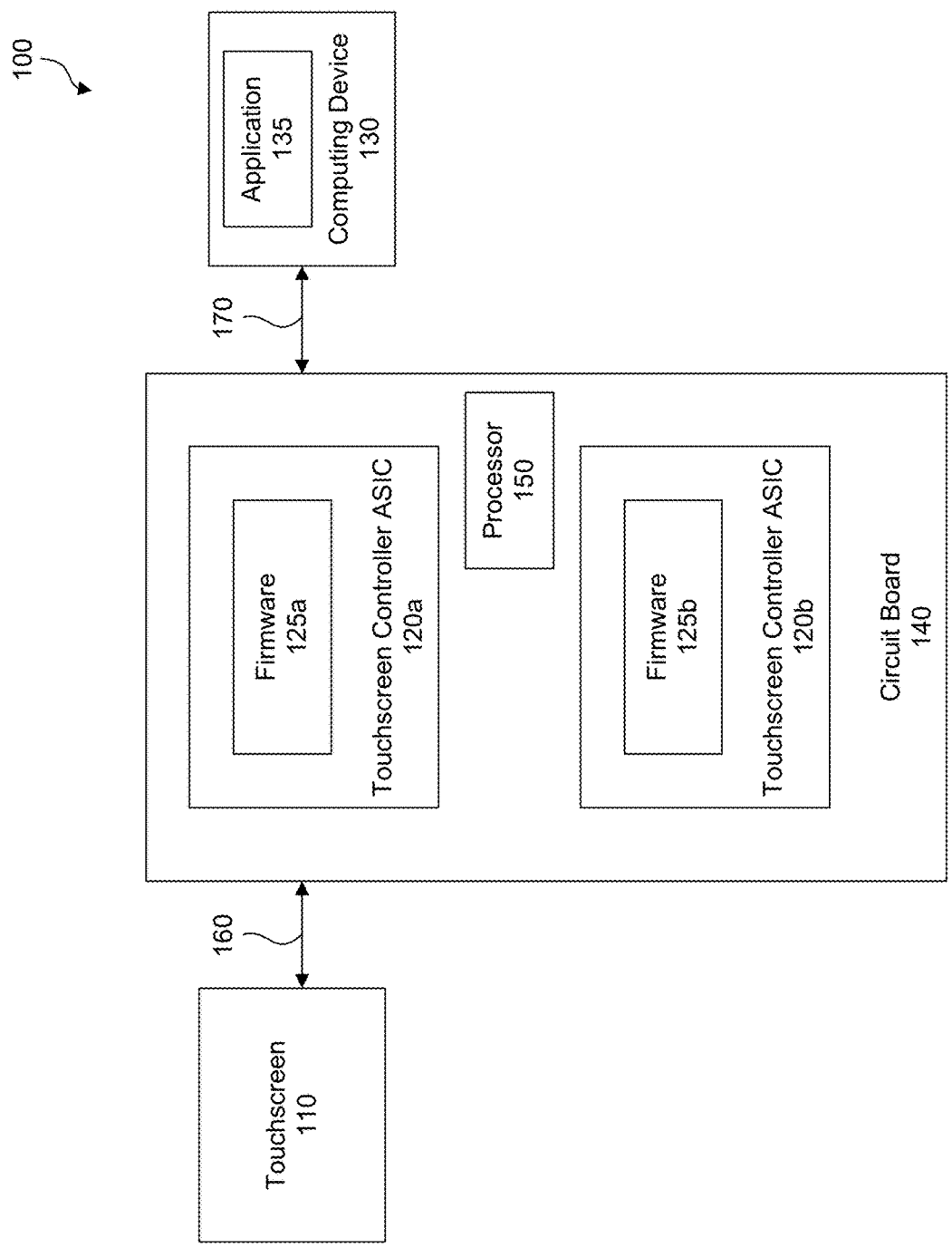
FIG. 1 illustrates a projected capacitive (PCAP) touch system, according to example embodiments of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

U.S. patent application Ser. No. 15/214,196, entitled Projected-Capacitive(PCAP) Touchscreen filed on Jul. 19, 2016, and U.S. patent application Ser. No. 14/871,496, entitled Supporting Multiple Users on a Large Scale Projected Capacitive Touchscreen ('496 Application) filed on Sep. 30, 2015, are herein incorporated by reference in their entirety. Both of these applications describe PCAP touchscreen systems.

U.S. patent application Ser. No. 62/508,549, entitled PCAP with Enhanced Immunity to Water Contaminants filed on May 19, 2017, ("Immunity Application") which is incorporated herein by reference in its entirety, includes description of a mixed-mode measurement frame that includes self-mode measurement and a mutual-mode measurement.

FIG. 1 illustrates a projected capacitive (PCAP) touch system 100 according to example embodiments of the disclosure. System 100 includes touchscreen 110, circuit board 140, and computing device 130. In embodiments, touchscreen 110 may be a large scale PCAP touchscreen used as an interactive table surface. The interactive table surface may be a large gaming table, a home entertainment system, an industrial control system, a corporate boardroom communication and collaboration device, etc.

Touchscreen 110 may be communicatively coupled to circuit board 140 via interface 160, and circuit board 140 may be communicatively coupled to computing device 130 via interface 170. Interfaces 160 and 170 may be wired or wireless and comprise various technologies including but not limited to universal serial bus (USB), Bluetooth™ Low Energy (BLE), Wi-Fi™, and/or logic traces on a circuit board that may be coupled to a connector.

Circuit board 140 may include two or more touchscreen controller application-specific integrated circuits (ASICs) although only 120a and 120b are depicted. Each touchscreen controller ASIC 120 includes their respective firmware 125. Computing device 130 may be a host computer running software application 135 (e.g., application-level software), such as a gaming application. Software application 135 may support multiple users that interact with software application 135. Touchscreen controllers ASIC 120a and 120b include corresponding firmware 125 that may communicate with software application 135 in computing device 130 via a communication protocol to support the performance characteristics of software application 135. The communication between firmware 125 and software application 135 may be indirect via processor 150.

Circuit board 140 may also include processor 150 that may include a USB interface, for example. Processor 150 may receive coarse touch coordinate data from each of the touchscreen controller ASICs 120, and use the received coarse touch coordinate data to calculate final touch coordinates, for example by linear interpolation or weighted summation. Processor 150 may generate reports that include the final touch coordinates (e.g., (x,y) coordinates) and transmit the reports to computing device 130 via interface 170. Note that there is no exchange of raw touch signal data (e.g., raw mutual capacitance measurements) between touchscreen controller ASIC 120a and touchscreen controller ASIC 120b. Coarse touch coordinate data is different than raw touch signal data. For example, coarse touch coordinate data may include compressed and processed high-level information regarding portioned estimates of touch coordinates and portioned touch signal sums around touch center locations from each of the touchscreen controller ASICs 120 as described later.

A case may arise ASIC 120a may provide clock synchronization information to touchscreen controller ASIC 120b, such as when touchscreen controller ASIC 120a is a master device and touchscreen controller ASIC 120b is a slave device. Providing clock synchronization information is not the same as exchanging raw touch signal data. Accordingly, processor 150 may be included in the master device, touchscreen controller ASIC 120a. Thus, touchscreen controller ASIC 120b may transmit coarse touch coordinate data to processor 150 for combining the coarse touch coordinate data from touchscreen controller ASIC 120b with coarse touch coordinate data received from touchscreen controller ASIC 120a to produce final touch coordinates.

First Exemplary Touchscreen

FIG. 2A and FIG. 2B illustrate an exemplary first electrode pattern 200 that can be used to implement touchscreen 110 of FIG. 1, according to an exemplary embodiment of the present disclosure. For explanation purposes, FIG. 2A and FIG. 2B may be described with elements from previous figures. Electrode pattern 200 includes vertical electrodes 202.1 through 202.M, configured and arranged in series of M columns, and a plurality of adjacent floating transparent conductive islands disposed on a transparent substrate 204. The transparent substrate 204 represents one or more optically transparent materials. The one or more non-conductive, optically transparent materials can be flexible or inflexible. In an exemplary embodiment, the transparent substrate 204 is implemented using a plate of glass.

The vertical electrodes 202.1 through 202.M are oriented in a vertical direction, such as parallel to the y-axis of the Cartesian coordinate system and perpendicular to the x-axis of the Cartesian coordinate system. In this configuration and arrangement, the vertical electrodes 202.1 through 202.M may be referred to as "X" electrodes due to their role in determining the x coordinates of the touch of the operator when present. However, those skilled in the relevant art(s) will recognize that the other configurations and arrangements for the vertical electrodes 202.1 through 202.M are possible without departing from the spirit and scope of the present disclosure.

As illustrated in FIG. 2A, the vertical electrodes 202.1 through 202.M include electrode pads 206.1.1 through 206.i.M and electrode terminuses 208.1.1 through 208.2.M. In an exemplary embodiment, the electrode terminuses 208.1.1 through 208.2.M represent interfaces between the electrode pads 206.1.1 through 206.i.M and associated electronics, such as by using one or more printed silver conductors on the transparent substrate 204 and/or one or more flex cables.

As additionally illustrated in FIG. 2A, the electrode pads 206.1.1 through 206.i.M are configured and arranged in a series of i rows and a series of M columns on the transparent substrate 204. Similarly, the electrode terminuses 208.1.1 through 208.2.M are configured and arranged in a series of two rows and a series of M columns on the transparent substrate 204. Suitable connections between the electrode pads 206.1.1 through 206.i.M to corresponding electrode terminuses 208.1.1 through 208.2.M form a corresponding vertical electrode from among the vertical electrodes 202.1 through 202.M. For example, the electrode pads 206.1.1 through 206.i.1 within a first column are mechanically and electrically connected to the electrode terminuses 208.1.1 through 208.2.1 from among a first column to form the vertical electrode 202.1. However, those skilled in the relevant art(s) will recognize that other groupings of the electrode pads 206.1.1 through 206.i.M for one or more of the vertical electrodes 202.1 through 202.M are possible without departing from the spirit and scope of the present disclosure.

As shown in FIG. 2A, electrode pads 206.1.1 through 206.i.M can each have one or more floating transparent conductive islands adjacent to it. For example, each of electrode pads 206.1.1 through 206.i.M can have four floating transparent conductive islands 212.1 through 212.a adjacent to it, as illustrated in further detail with respect to electrode pad 206.1.M−1 located in a portion 210 of electrode pattern 200. Although four floating transparent conductive islands 212.1 through 212.a are illustrated in FIG. 2A, those skilled in the relevant art(s) will recognize that other numbers of transparent conductive islands are possible without departing from the spirit and scope of the present disclosure. In an exemplary embodiment, the electrode pads 206.1.1 through 206.i.M and the plurality of floating transparent conductive islands can be implemented using a suitable transparent conductor, e.g., indium-tin-oxide (ITO). Further, although the electrode pads 206.1.1 through 206.i.M are implemented in a shape of a diamond in FIG.

2A, it should be appreciated that this is illustrative and not restrictive of the shape that can be implemented by those skilled in the relevant art(s).

As the term 'floating' implies, the plurality of floating transparent conductive islands represent shapes of transparent conductive material, which are not electrically connected within the electrodes 202.1 through 202.M. In an embodiment, the plurality of floating transparent conductive islands eliminate, or substantially reduce, one or more optical discontinuities that would be otherwise present in touchscreen 110 that includes electrodes 202.1 through 202.M.

FIG. 2B illustrates a cross-section of the portion 210 of electrode pattern 200 along the line A-A', and includes a cross-section of the transparent substrate 204, a cross-section of the electrode pad 206.1.M−1, a cross-section of the floating transparent conductive island 212.1, and a cross-section of the floating transparent conductive island 212.3. In an exemplary embodiment, the transparent substrate 204 is implemented as a plate of glass with an approximate thickness between a fraction of a millimeter to several millimeters, while the electrode pad 206.1.M−1, the floating transparent conductive island 212.1, and/or the floating transparent conductive islands 212.3 is implemented using a coating of ITO with an approximate thickness less than a wavelength of light.

Figures 3A, 3B:
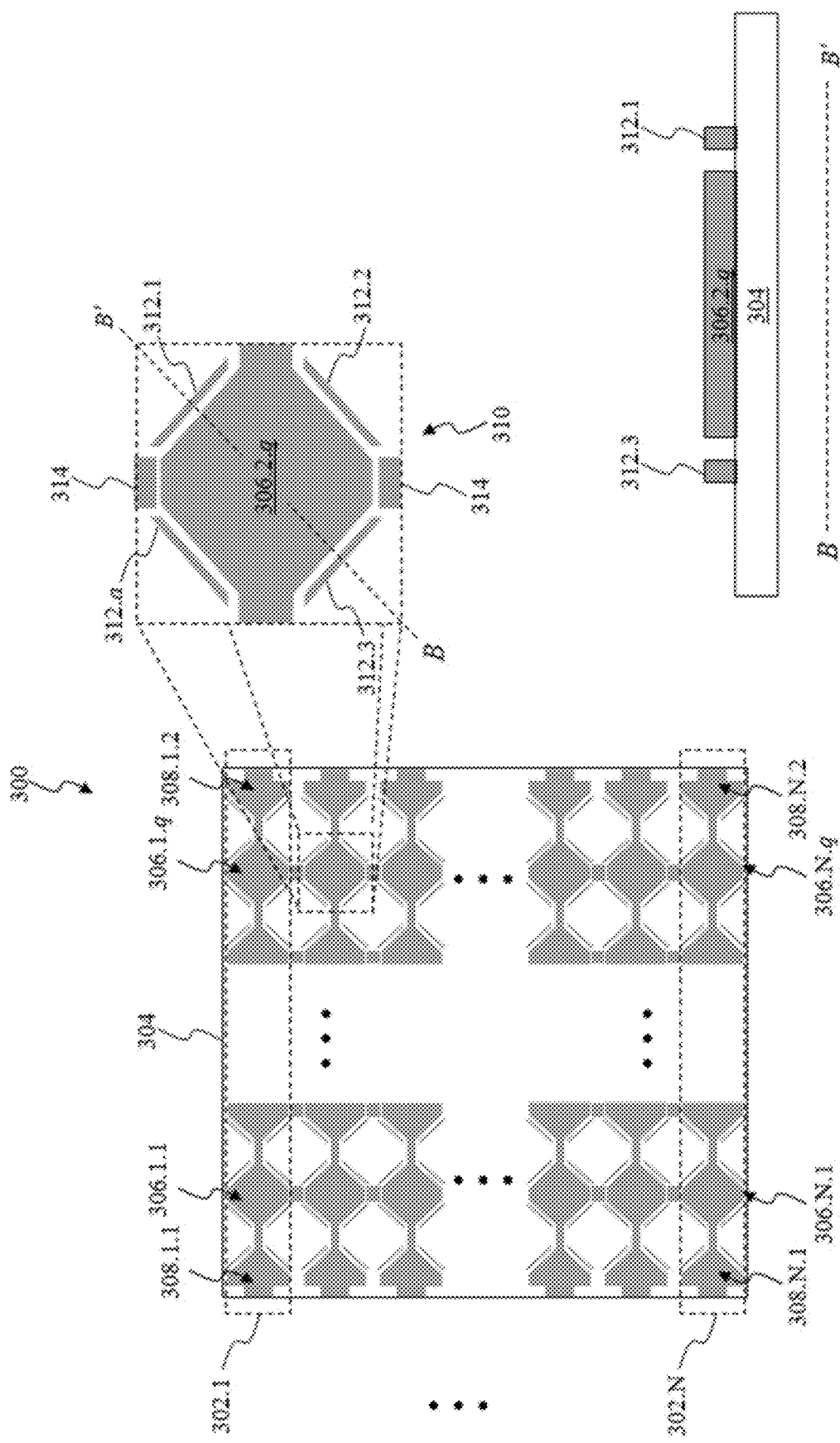
FIG. 3A and FIG. 3B illustrate an exemplary second electrode pattern that can be used to implement the touchscreen according to an exemplary embodiment of the present disclosure.

FIG. 3A and FIG. 3B illustrate an exemplary second electrode pattern 300 that can be used to implement touchscreen 110 according to an exemplary embodiment of the present disclosure. For explanation purposes, FIGS. 3A and 3B may be described with elements from previous figures. Second electrode pattern 300 includes horizontal electrodes 302.1 through 302.N, configured and arranged in a series of N rows, and a plurality of adjacent floating transparent conductive islands disposed on a transparent substrate 304. The transparent substrate 304 is substantially similar to the transparent substrate 204 and will not be discussed in further detail. However, those skilled in the relevant art(s) will recognize that the transparent substrate 304 can be implemented with a different material from the transparent substrate 204 without departing from the spirit and scope of the present disclosure.

In the exemplary embodiment illustrated in FIG. 3A, the horizontal electrodes 302.1 through 302.N are oriented in a horizontal direction, such as perpendicular to the y-axis of the Cartesian coordinate system and parallel to the x-axis of the Cartesian coordinate system. In this configuration and arrangement, the horizontal electrodes 302.1 through 302.N may be referred to as "Y" electrodes due to their role in determining the y coordinates of the touch of the operator when present. However, those skilled in the relevant art(s) will recognize that the other configurations and arrangements for the electrodes 302.1 through 302.N are possible without departing from the spirit and scope of the present disclosure.

As illustrated in FIG. 3A, the horizontal electrodes 302.1 through 302.N include electrode pads 306.1.1 through 306.N.q and electrode terminuses 308.1.1 through 308.N.2. In an exemplary embodiment, the electrode terminuses 308.1.1 through 308.N.2 represent interfaces between the electrode pads 306.1.1 through 306.N.q and associated electronics, such as by using one or more printed silver conductors on the transparent substrate 304 and/or one or more flex cables.

As additionally illustrated in FIG. 3A, the electrode pads 306.1.1 through 306.N.q are configured and arranged in a series of N rows and a series of q columns on the transparent substrate 304. Similarly, the electrode terminuses 308.1.1 through 308.N.2 are configured and arranged in a series of N rows and a series of two columns on the transparent substrate 304. Suitable connections between the electrode pads and corresponding electrode terminuses form a corresponding horizontal electrode. For example, the electrode pads 306.1.1 through 306.1.$q$ are mechanically and electrically connected to the electrode terminuses 308.1.1 through 308.1.2 to form the horizontal electrode 302.1. However, those skilled in the relevant art(s) will recognize that other groupings of the electrode pads 306.1.1 through 306.N.q for one or more of the horizontal electrodes 302.1 through 302.N are possible without departing from the spirit and scope of the present disclosure.

As shown in FIG. 3A, electrode pads 306.1.1 through 306.N.q, can each have one or more floating transparent conductive islands adjacent to it. For example, each of electrode pads 306.1.1 through 306.N.q can have floating transparent conductive islands 312.1 through 312.$a$ and floating transparent conductive islands 314 adjacent to it, as illustrated in further detail with respect to electrode pad 306.2.$q$ located in a portion 310 of electrode pattern 300. In an embodiment, the electrode pads 306.1.1 through 306.N.q and the plurality of floating transparent conductive islands of electrode pattern 300 are substantially similar to the electrode pads 206.1.1 through 206.$i$.M and the plurality of floating transparent conductive islands of electrode pattern 200, respectively; therefore, only differences are discussed in further detail herein.

FIG. 3B illustrates a cross-section of the portion 310 of electrode pattern 300 along the line B-B', which includes a cross-section of the transparent substrate 304, a cross-section of the electrode pad 306.2.$q$, a cross-section of the floating transparent conductive island 312.1, and a cross-section of the floating transparent conductive island 312.3.

Figure 4A:
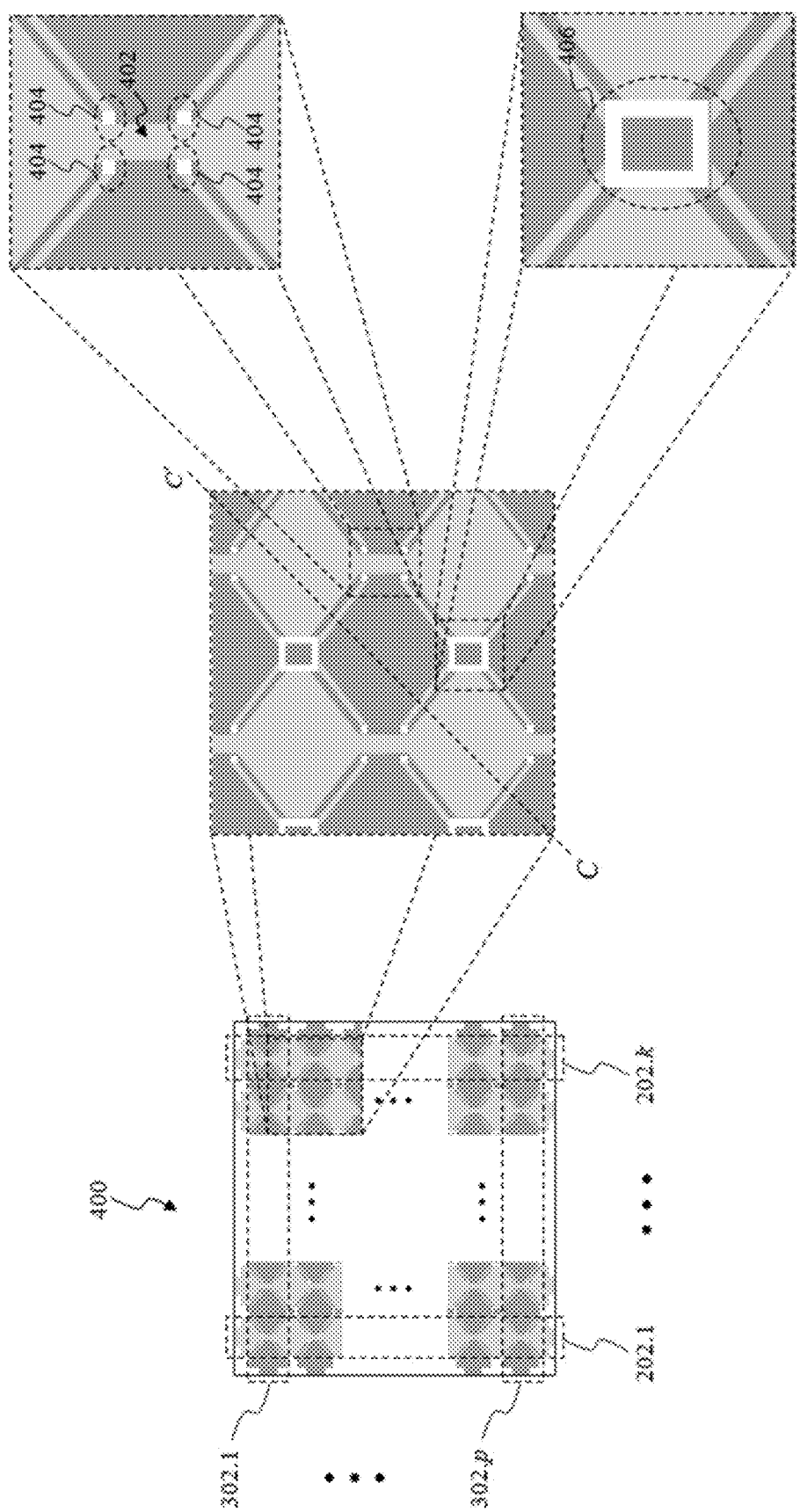
FIG. 4A illustrates a first exemplary touchscreen according to an exemplary embodiment of the present disclosure.

FIG. 4A illustrates a first exemplary touchscreen 400 according to an exemplary embodiment of the present disclosure. For explanation purposes, FIG. 4A may be described with elements from previous figures. For example, touchscreen 400 may be the same as touchscreen 110. As illustrated in FIG. 4A, the first electrode pattern 200, illustrated in "light gray," and the second electrode pattern 300, illustrated in "dark gray," are overlaid on top of each other to form the touchscreen 400. In an embodiment, transparent substrates 204 and 304 are attached to each other (with the electrode patterns 200 and 300 facing each other) with an optically clear adhesive (OCA) to form the touchscreen 400. As illustrated in FIG. 4A, the vertical electrodes 202.1 through 202.M are placed side-by-side in a horizontal direction where each successive vertical electrode 202.1 to 202.M has an increasing x coordinate in a Cartesian coordinate system to provide an example. Similarly, the horizontal electrodes 302.1 through 302.N are placed one-above-the-other in a vertical direction where each successive horizontal electrode 302.1 to 302.$q$ has an increasing y coordinate in a Cartesian coordinate system to provide an example, to form the touchscreen 400. In an exemplary embodiment, the touchscreen 400 represents a PCAP touchscreen.

FIG. 4A additionally illustrates a portion of the touchscreen 400 in further detail. As discussed above, the touchscreen 400 is formed by overlaying electrode patterns 200 and 300 on top of each other. Ideally, when electrode patterns 200 and 300 are overlaid on top of each other, a single layer of transparent conductive material can be perceived by the human eye when viewing the touchscreen 400. However, in some situations, one or more optical discontinuities may be present in the touchscreen 400.

As illustrated in FIG. 4A, one or more first regions 402 represent one or more first optical discontinuities having two or more layers of transparent conductive material formed by the overlaying of electrode patterns 200 and 300. For example, the one or more first regions 402 result from connections among columns of the electrode pads 206.1.1 through 206.$i$.M (of electrode pattern 200) overlaying corresponding connections among rows of the electrode pads 306.1.1 through 306.N.q (of electrode pattern 300).

As further illustrated in FIG. 4A, one or more second regions 404 and 406, illustrated in "white" in FIG. 4A, represent one or more second optical discontinuities having no layers of transparent conductive material formed by the overlaying of electrode patterns 200 and 300. The one or more second regions 404 represent regions having no layers of transparent conductive material at the ends of the floating transparent conductive islands 212.1 through 212.$a$ (of electrode pattern 200) and/or the floating transparent conductive islands 312.1 through 312.$a$ (of electrode pattern 300). Similarly, the one or more second regions 406 represent regions having no layers of transparent conductive material between the electrode pads 206.1.1 through 206.$i$.M and the electrode pads 306.1.1 through 306.N.q and associated floating transparent conductive islands.

Operation of the First Exemplary Touchscreen

Figure 7A:
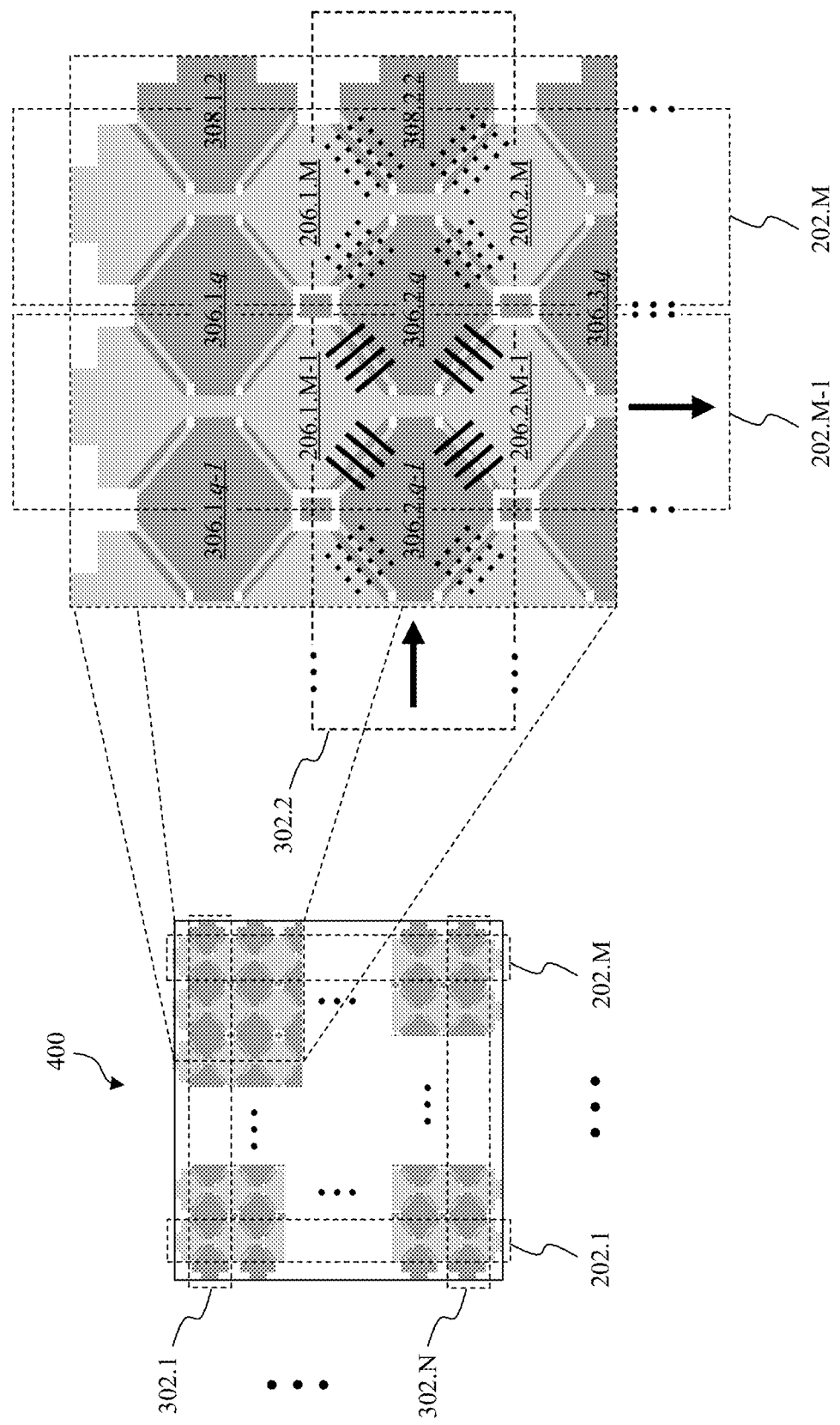
FIGS. 7A and 7B illustrate operation of the first exemplary touchscreen according to an exemplary embodiment of the present disclosure.
Figure 7B:
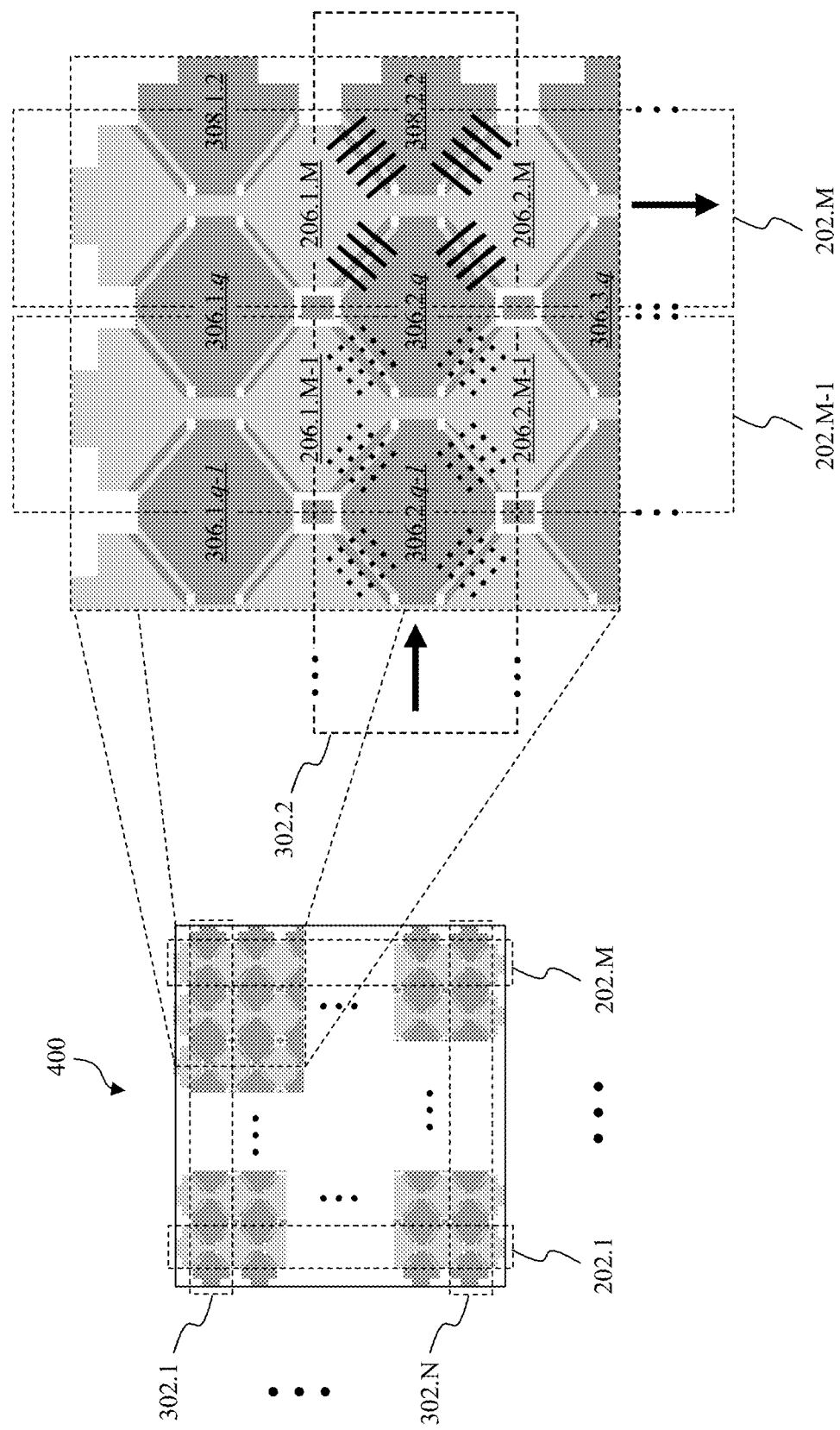

FIGS. 7A and 7B illustrate operation of the first exemplary touchscreen according to an exemplary embodiment of the present disclosure. As discussed above in FIG. 4A, the first electrode pattern 200, illustrated in "light gray," and the second electrode pattern 300, illustrated in "dark gray," are attached to form the touchscreen 400. Although only the operation of the touchscreen 400 is to be described in FIGS. 7A and 7B, those skilled in the relevant art(s) will recognize that this exemplary operation of the touchscreen 400 is likewise applicable to the touchscreen 110 without departing from the spirit and scope of the present disclosure.

The touchscreen 400 can operate in a row scanning mode of operation or in a column scanning mode of operation. In the row scanning mode of operation, one or more horizontal electrodes from among the horizontal electrodes 302.1 through 302.N are sequentially excited by a drive signal. The drive signal capacitively couples to one or more vertical electrodes from among the vertical electrodes 202.1 through 202.M. Transferred electrical charges or currents due to mutual capacitance(s) between the driven horizontal electrode and the one or more vertical electrodes are measured to detect a presence and/or a location of a touch from an operator, such as a finger of the operator, a hand of the operator, and/or other objects available to the operator, such as a stylus to provide an example. Similarly, in the column scanning mode of operation, one or more vertical electrodes from among the vertical electrodes 202.1 through 202.M are sequentially excited by a drive signal. The drive signal capacitively couples to one or more horizontal electrodes from among the horizontal electrodes 302.1 through 302.N. Transferred electrical charges or currents due to mutual capacitance(s) between the driven vertical electrode and the one or more horizontal electrodes are measured to detect a presence and/or a location of a touch from an operator. The description to follow further describes the operation of the touchscreen 400 in the row scanning mode of operation. Those skilled in the relevant art(s) will recognize that the column scanning mode of operation operates in a similar manner without departing from the spirit and scope of the present disclosure.

During the row scanning mode of operation and as further illustrated in FIGS. 7A and 7B, a horizontal electrode from among the horizontal electrodes 302.1 through 302.N is driven by an excitation signal which capacitively couples to all vertical electrodes 202.1 through 202.M. Specifically, FIG. 7A illustrates capacitive coupling of the drive signal from horizontal electrode 302.2 and vertical electrode 202.M−1 while FIG. 7B illustrates capacitive coupling of the drive signal from horizontal electrode 302.2 and vertical electrode 202.M. For explanation purposes, FIGS. 7A and 7B may be described with elements from previous figures.

Generally, a mutual capacitance "$C_M$" is associated with each of the horizontal electrodes 302.1 through 302.N and a corresponding one of the vertical electrodes 202.1 through 202.M. For example, if "i" represents an index for a vertical electrode 202.$i$ from among the vertical electrodes 202.1 through 202.M, and if "j" represents an index of a horizontal electrode 302.$j$ from among the horizontal electrodes 302.1 through 302.N, then M·N mutual capacitances are present between the vertical electrodes 202.1 through 202.M and the horizontal electrodes 302.1 through 302.N, which can be denoted as the set of mutual capacitances $C_M(i,j)$ for i=1 to M and j=1 to N.

FIGS. 2-4, 7A and 7B illustrate only one specific construction and geometry of electrodes of a PCAP touchscreen. The floating islands are purely optional. The electrode material may be ITO, a metal mesh, silver nanowires, an intrinsically conductive polymer, or any other conductive material. The electrode geometry may include diamond shaped pads (as in FIGS. 2-4, 7A, and 7B) or may simply divide the touch area into rectangular strips. The ideas presented below apply to any PCAP touchscreen with X and Y electrodes, that is to any touchscreen construction with a set of vertically oriented electrodes and with a set of horizontally oriented electrodes and associated self and mutual capacitances.

Figure 5:
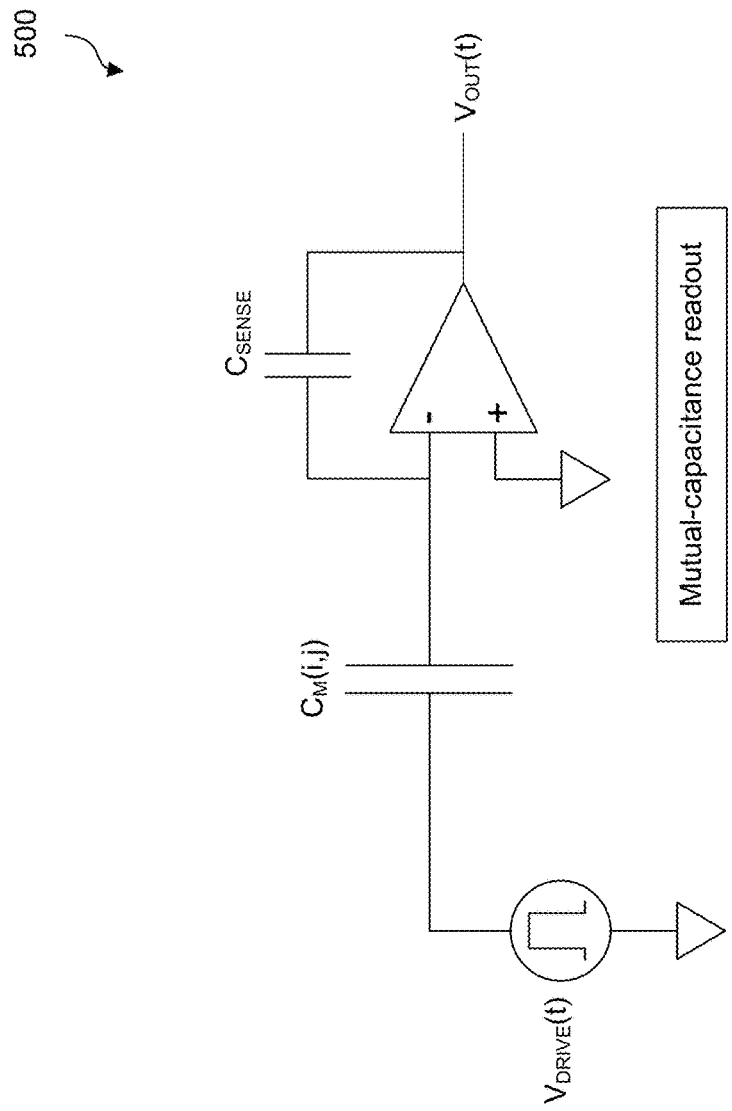
FIG. 5 illustrates a conceptual circuit for mutual-capacitance readout mode, according to example embodiments of the disclosure.

FIG. 5 illustrates a conceptual circuit 500 for mutual-capacitance readout mode, according to example embodiments of the disclosure. A signal VDRIVE(t) excites horizontal electrode j which couples through mutual capacitance CM(i,j) to vertical sense electrode which in turn is connected to a current sensing circuit. The signal output voltage VOUT(t) is proportional to the charge on the integrating capacitor CSENSE. Note that the excitation signal is connected to one electrode (electrode j) and the sensing circuit is connected to another electrode (electrode i) and the measured signal is proportional to the mutual capacitance CM(i,j). A touch reduces the value of CM(i,j) by an amount ΔCM(i,j). In other words, ΔCM(i,j) represents touch induced changes in the measured mutual capacitance between vertical electrode "i" and horizontal electrode "j" relative to the baseline values CM(i,j).

Figure 6:
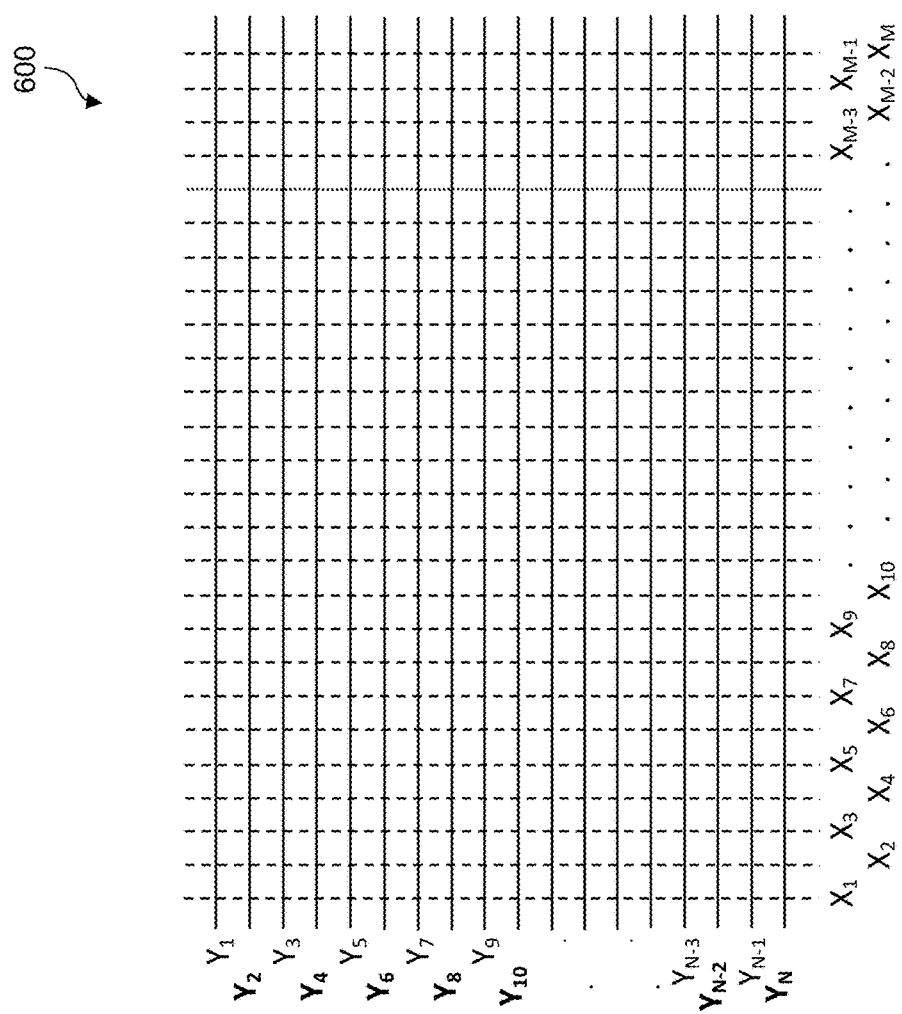
FIG. 6 illustrates a schematic representation of a PCAP touchscreen, according to example embodiments of the disclosure.

FIG. 6 illustrates a schematic representation 600 of a PCAP touchscreen, according to example embodiments of the disclosure. For explanation purposes, FIG. 6 may be described with elements from previous figures. FIG. 6 is a simplified schematic representation of the PCAP touchscreen of FIG. 7A or 7B. The dashed vertical lines labeled $X_1, X_2, X_3, \ldots X_i \ldots X_M$ represent vertical electrodes i=1, 2, 3, . . . M. The solid horizontal lines labeled $Y_1, Y_2, Y_3, \ldots Y_j \ldots Y_N$ represent horizontal electrodes j=1, 2, 3, . . . N. Each intersection of a vertical dashed line i and horizontal solid line j represents a measured mutual capacitance $C_M(i,j)$ and measured mutual capacitance change $\Delta C_M(i,j)$.

Figure 8:
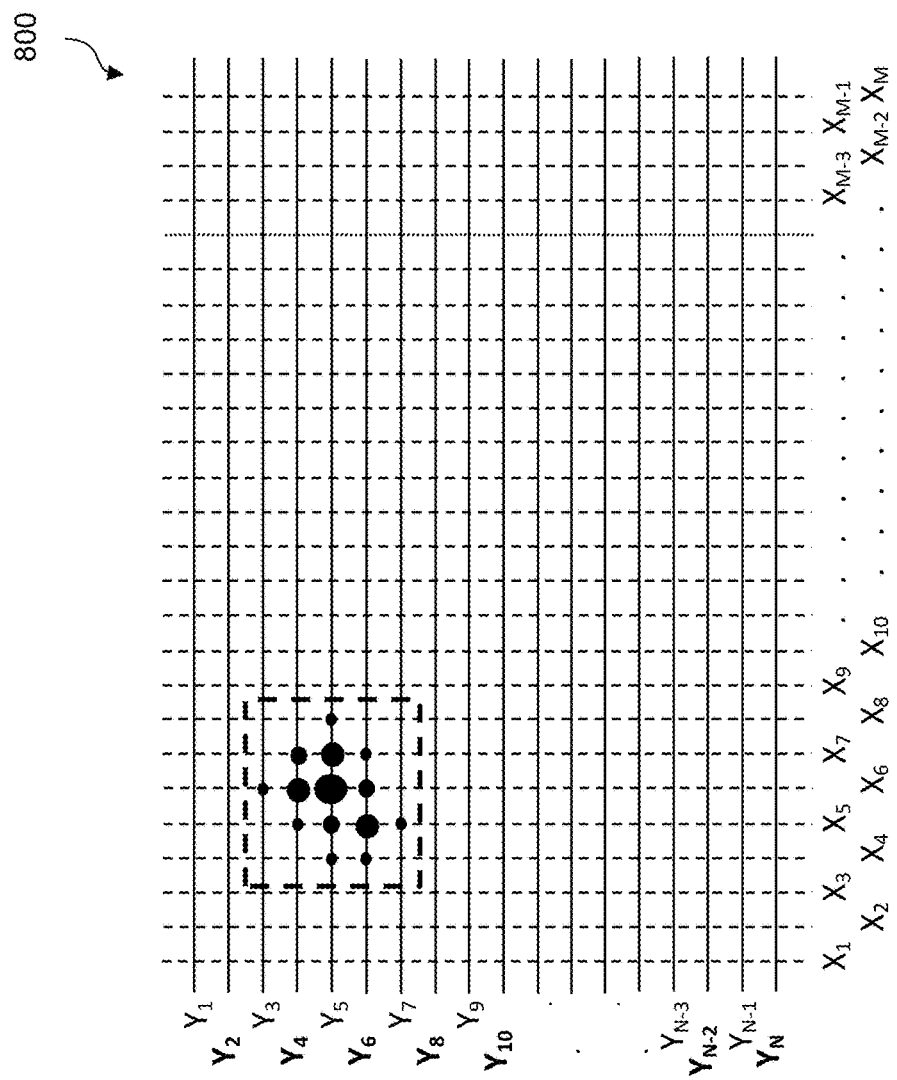
FIG. 8 illustrates a modified schematic representation of a PCAP touchscreen with finger touch signal strengths displayed on touchscreen, according to example embodiments of the disclosure.

FIG. 8 illustrates a modified schematic representation 800 of a PCAP touchscreen, according to example embodiments of the disclosure. For explanation purposes, FIG. 8 may be described with elements from previous figures. FIG. 8 is a modified version of the FIG. 6 in which solid circles indicate intersections of electrodes with significant non-zero values of mutual capacitance change $\Delta C_M(i,j)$ resulting from a touch. Large circle diameters correspond to larger values of $\Delta C_M(i,j)$. The touch center is close to the intersection of the vertical electrode labeled $X_6$ and the horizontal electrode labeled $Y_5$. The dashed square encloses all electrode intersections (i,j) with measurably non-zero values of $\Delta C_M(i,j)$. As drawn, the dashed square includes electrode intersections (i,j) for which i=4, 5, 6, 7 or 8 and for which j=3, 4, 5, 6 or 7. Letting $i_{MIN}$ and $i_{MAX}$ be the minimum and maximum vertical electrode index values in the neighborhood of the touch, as drawn, $i_{MIN}$=4 and $i_{MAX}$=8. Likewise, letting $j_{MIN}$ and $j_{MAX}$ define the vertical extent of the touch area with the values, $j_{MIN}$=3 and $j_{MAX}$=7, as drawn in the sketch. Low-level raw touch signal data values of $\Delta C_M(i,j)$ within the touch area $i_{MIN} \leq i \leq i_{MAX}$ and $j_{MIN} \leq j \leq j_{MAX}$ may be processed to derive high-level (x,y) touch coordinate information for the related touch.

Below are formulas that may be used to process the low-level raw touch signal data $\Delta C_M(i,j)$ to produce the high-level touch coordinates (x,y). Note that the resulting high-level information, namely the two numbers x and y, are highly compressed relative to the corresponding low-level data $\Delta C_M(i,j)$, which corresponds to 28 numbers as drawn in FIG. 8.

$$x = \sum_{i=i_{MIN}}^{i_{MAX}} \sum_{j=j_{MIN}}^{j_{MAX}} X_i \cdot \Delta C_M(i,j)/S$$

$$y = \sum_{i=i_{MIN}}^{i_{MAX}} \sum_{j=j_{MIN}}^{j_{MAX}} Y_j \cdot \Delta C_M(i,j)/S$$

$$S = \sum_{i=i_{MIN}}^{i_{MAX}} \sum_{j=j_{MIN}}^{j_{MAX}} \Delta C_M(i,j)$$

Readout of projected-capacitive touchscreens is done with appropriate controller electronics. Typically, controller electronics is in the form of a printed circuit board containing a number of electronic components including a sophisticated ASIC. The ASIC coordinates drive signals and measures the mutual capacitance signals $\Delta C_M(i,j)$. Particularly for small projected-capacitive touchscreens used in mobile devices, a single ASIC contains sufficient circuitry and pins to support all of the touchscreens M+N electrodes. However, for larger commercial touchscreens, it is often the case that the controller electronics includes multiple ASICs to provide a sufficient number of electronic channels (e.g., driver and receiver circuits) to support all touchscreen electrodes.

Figure 9:
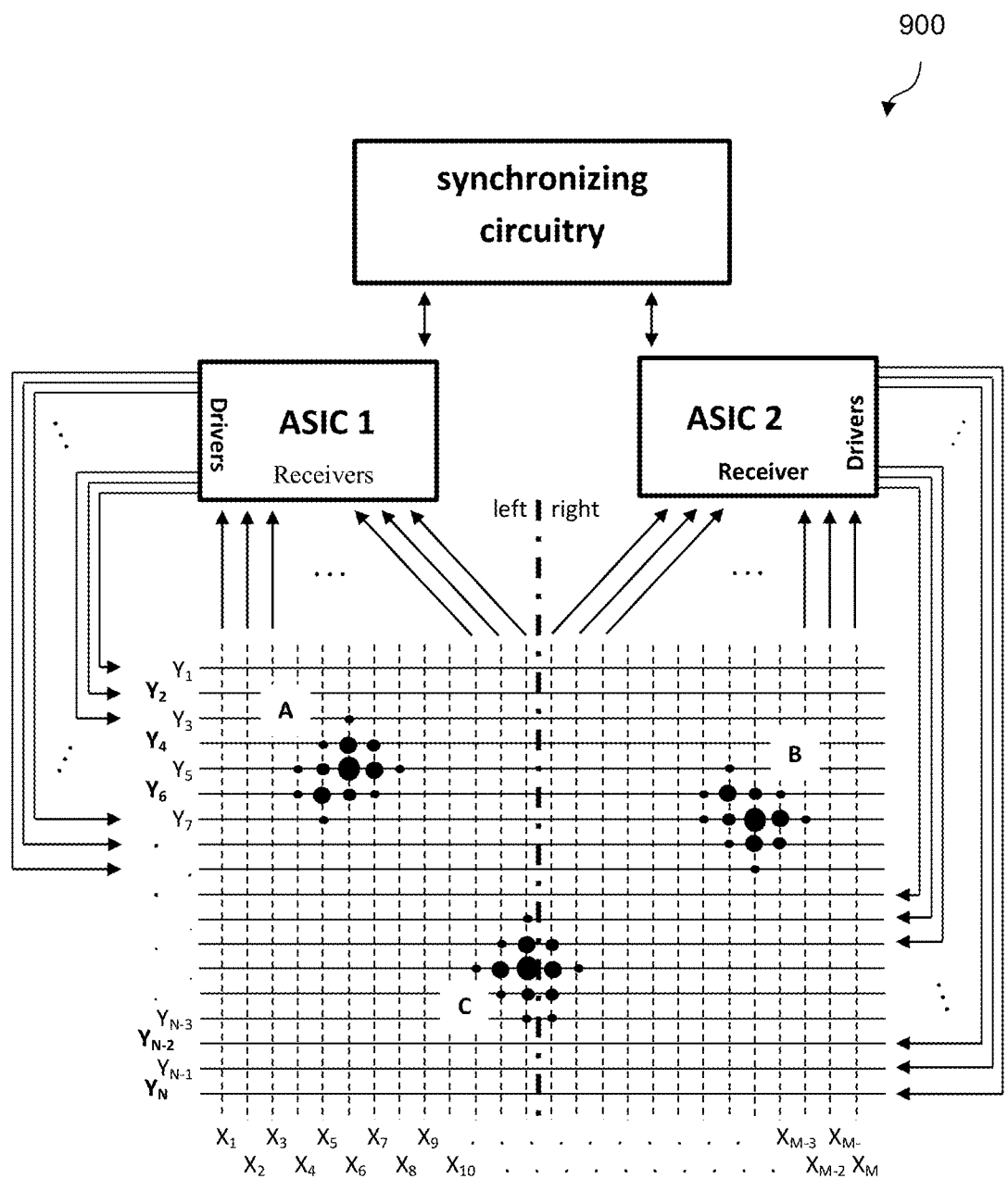
FIG. 9 illustrates challenges of a large PCAP touchscreen with inter-ASIC data transfer between two touch controller ASICs used to control the large PCAP touchscreen.

FIG. 9 illustrates a large PCAP touchscreen 900 with two touch controller ASICs requiring challenging inter-ASIC data transfer. For explanation purposes, FIG. 9 may be described with elements from previous figures. Although FIG. 9 illustrates a case in which two ASICs are used, more than two ASICs are possible. When a first ASIC receives signals from the vertical electrodes on the left half of the touchscreen and a second ASIC receives signals from the vertical electrodes on the right half of the touchscreen, the first ASIC measures mutual capacitance signals $\Delta C_M(i,j)$ for i=1, 2, 3, ... M/2 while the second ASIC measures mutual capacitance signals for i=M/2+1, M/2+2, M/2+3, ... M. If M is odd, M/2 is replaced by the integer value (M−1)/2, and more generally the touchscreen be divided into left and right portions of unequal size.

The horizontal electrodes are driven sequentially, one at the time. For example, the horizontal electrode $Y_1$ may be excited by driver circuits in ASIC 1, then $Y_2$, then $Y_3$, etc. while ASIC 2 driver circuits are off. After horizontal electrode with j index equal to N/2 has been excited, then the ASIC 1 driver circuits are turned off. After that ASIC 2 excites the horizontal electrode with j index equal to (N/2+1), and then (N/2+2), (N/2+3), etc. through to the last horizontal electrode $Y_N$. Note that even when one ASIC has its driver circuits off, its receiver circuits may be actively measuring values of $C_M(i,j)$ with the aid of excitation signals from the other ASIC. To enable one ASIC to make measurements with the aid of the other ASIC's excitation drive signals, the timing of the two ASICs are carefully synchronized. This is illustrated in FIG. 9 by synchronizing circuitry in communication with both ASICs. At a minimum the synchronizing circuitry contains a clock. Optionally the synchronizing circuitry may be complex and include a programmable microprocessor (e.g., processor 150 of FIG. 1.)

Figure 10:
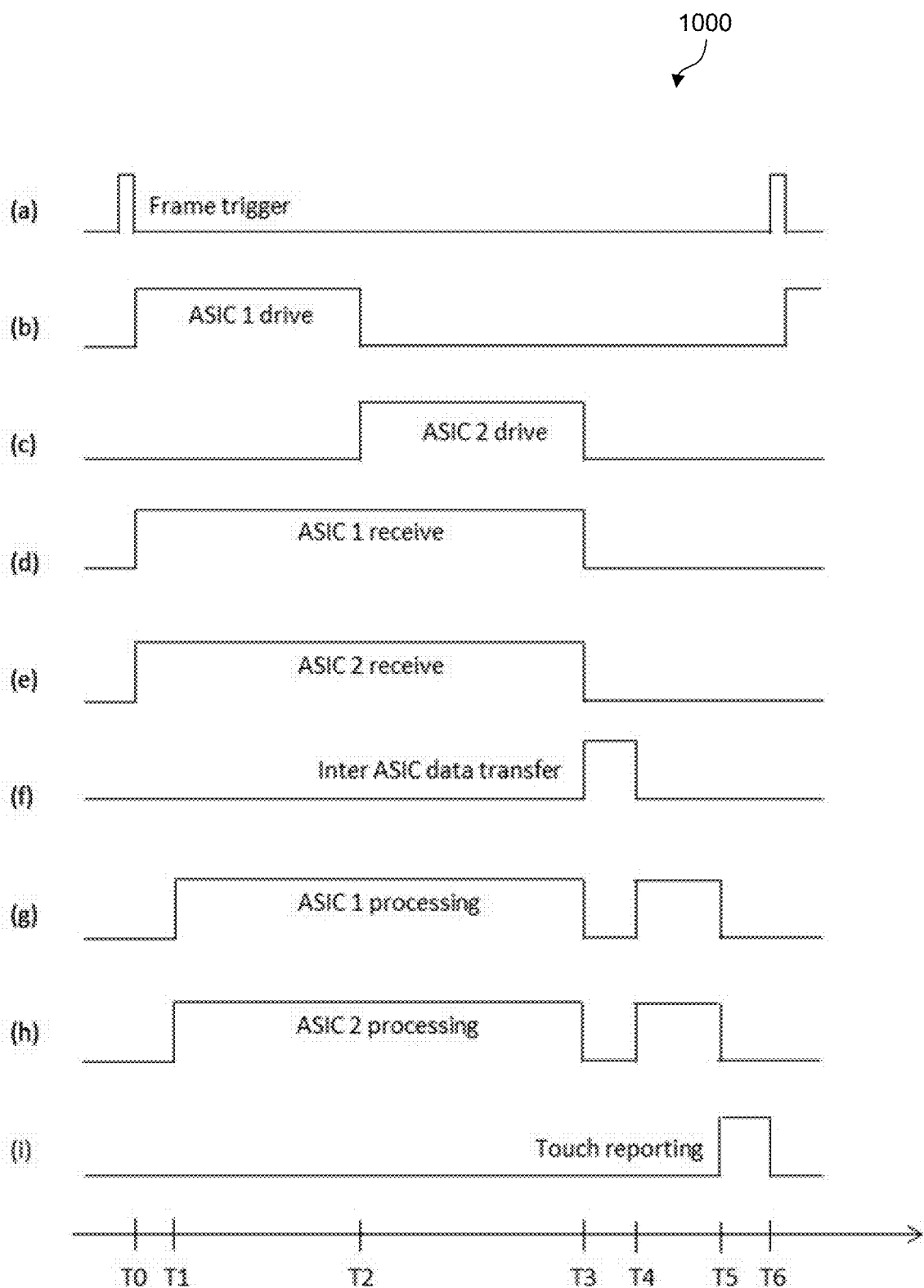
FIG. 10 illustrates challenges of a large PCAP touchscreen with inter-ASIC data transfer between two touch controller ASICs in a timing diagram.

FIG. 10 illustrates a timing diagram 1000 representative of timing challenges of a large PCAP touchscreen with inter-ASIC data transfer between two touch controller ASICs. For explanation purposes, FIG. 10 may be described with elements from previous figures. Timing diagram 1000 corresponds to activity of the large PCAP touchscreen 900 of FIG. 9. Logic trace (a) illustrates a periodic frame trigger pulse that initiates measurement and processing of mutual capacitance signals $\Delta CM(i,j)$. In the logic traces of timing diagram 1000, a high level is logical "true" and low level is logical "false."

The time between successive pluses in logic trace (a) is the report rate of the touchscreen system. For example, if the time between successive pulses is 10 millisecond, then the report rate is 100 Hz or one-hundred touch coordinate reports per second. Typically, applications require that the time difference between successive frame trigger pulses be short compared to human perception times, for example, 10 milliseconds between frame trigger pulses. In the example given in the figure, the time between pulses in logic trace (a) is also an upper limit to the touch system latency, that is the time between physical contact of a finger touch and reported touch coordinates; however as will be discussed later, latency limits may differ if touches are reported in the next frame after the frame in which the touch measurements are made.

As illustrated in logic trace (b), drive signals from ASIC 1 for horizontal electrodes are initiated by the frame trigger pulse at time T0 and continues until time T2. At time T2, excitation of the upper horizontal electrodes is complete, and ASIC 2 begins driving horizontal electrodes in the lower half of the touchscreen. ASIC 2 generates such drive signals between time T2 and T3; see logic trace (c).

As illustrated in logic traces (d) and (e), both ASIC 1 and ASIC 2 are receiving signals from vertical electrodes and measuring mutual capacitance signals $\Delta C_M(i,j)$ the entire time that either ASIC 1 or ASIC 2 are generating drive signals for horizontal electrodes.

The ASICs do not need to wait until all data is collected in order to initiate processing of raw mutual capacitance measurements into touch coordinates. For example, ASIC 1 has all the information needed to compute the (x,y) coordinates of touch A illustrated in FIG. 9 after the seventh horizontal electrode has been excited (e.g., $Y_7$). Likewise ASIC 2 can reconstruct the (x,y) coordinates of touch B long before all mutual capacitance values $\Delta C_M(i,j)$ have been measured. As illustrated in logic traces (g) and (h), the ASICs can start processing touch information and computing touch (x,y) coordinates at time T1 shortly after commencement of receive signal measurements (e.g., see (d) and (e)). The ASICs can complete calculations of the (x,y) coordinates of touches A and B in parallel to receive signal measurements. However, touches that overlap the boundary between the left and right halves of the touchscreen, such as touch C in FIG. 9, present a special problem.

At the completion of data acquisition at time T3, neither ASIC 1 nor ASIC 2 have sufficient information to compute the (x,y) coordinates of touch C. Before raw signal data $\Delta C_M(i,j)$ can be processed to produce the (x,y) coordinates of touch C, low-level raw touch data are exchanged between the two ASICs (or transferred to a third processor for coordinate calculation). Logic trace (f) illustrates such transfer of low-level raw touch data between times T3 and T4. After this transfer is complete, ASIC1 and ASIC 2 have sufficient information to compute touch coordinates of all touches on the touchscreen, including those at the boundary between left and right halves of the touchscreen. This is illustrated in logic traces (g) and (h) where touch data processing recommences and completes between time T4 and time T5.

Finally, between time T5, and the next frame trigger at T6, high-level touch information (e.g., final (x,y) touch coordinate information) is reported from one of the touchscreen controller ASIC's (e.g., a master touchscreen controller ASIC) or a separate micro-processor unit which coordinates the reporting of the final high-level touch information to the host computer, perhaps after the "touch coordinate tracking algorithms" further process high-level (x,y) touch coordinate information by making use of correlations of touch coordinates between frames.

Dealing with touches in the overlap region, such as touch C, reduces system response time, or adds complexity and cost, increases digital noise in touch signal measurements, or a combination of two or all of these. Added cost may be in the form of increased product development time and expenses, as well as increased manufacturing costs of the resulting products.

There are several ways in which the response time associated with the above timing diagram can be improved. If touch reporting (e.g., logic trace (i)) can overlap with mutual capacitance signal measurements $\Delta C_M(i,j)$ (e.g., logic traces (d) and (e)), then the subsequent frame trigger pulse that initiates of the next cycle of data acquisition may be moved up from time T6 to time T5 or even T4; while this may improve the report rate, moving up the subsequent frame trigger pulse does not necessarily improve the latency of the touchscreen system. If inter-ASIC data transfer (e.g., logic trace (f)) can occur during measurement of mutual capacitance signals $\Delta C_M(i,j)$, the timing of the subsequent frame trigger pulse (e.g., logic trace (a)) may be moved earlier to time T3. However enabling such parallel activity adds to circuit complexity and cost and also increases risk that digital noise will compromise the quality of measurements of mutual capacitance signals $\Delta C_M(i,j)$.

As described above, multi-ASIC solutions for PCAP systems with large numbers of electrodes involve engineering trade-offs between response time, cost via complexity, and quality of signal measurements. There is demand for multi-ASIC solutions that minimize the engineering compromises made in such trade-offs.

Figure 11:
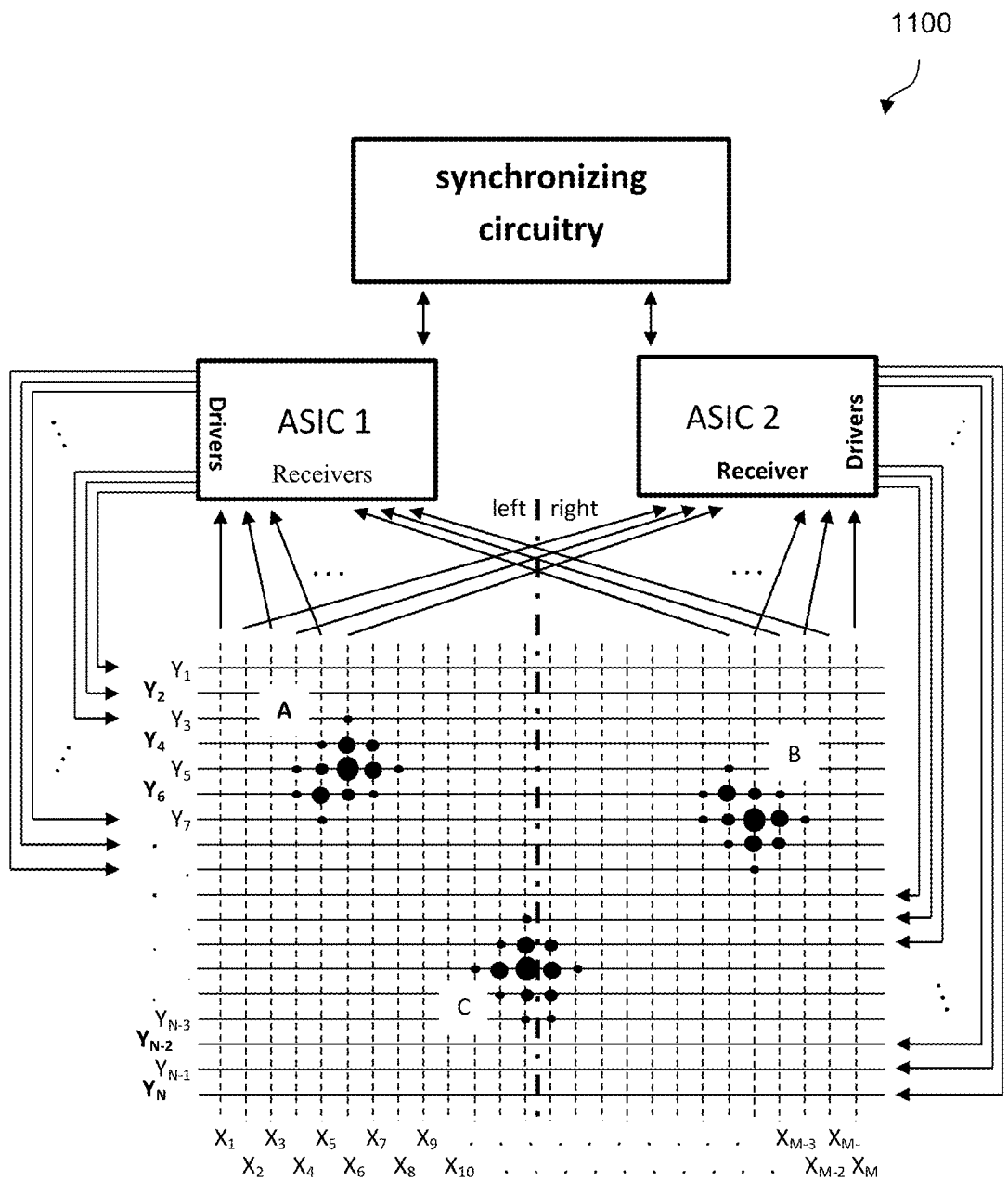
FIG. 11 illustrates a large PCAP touchscreen controlled by two touch controller ASICs with interleaved receiver connections for mutual capacitance measurements, according to example embodiments of the disclosure.

FIG. 11 illustrates a large PCAP touchscreen 1100 with two touch controller ASICs with interleaved receiver connections with mutual capacitance measurements, according to example embodiments of the disclosure. For explanation purposes, FIG. 11 may be described with elements from previous figures. In some embodiments, connections between vertical electrodes and ASIC receiver circuits have been altered. Instead of being connected to the left vertical electrodes with indices i=1, 2, 3 . . . M/2, ASIC 1 is now connected to vertical electrodes with odd numbered indices i=1, 3, 5 . . . (M−1). Instead of connections to the right vertical electrodes, ASIC 2 is now connected to vertical electrodes with even numbered indices i=2, 4, 6 . . . M. This embodiment may be further reflected in the layout of touch controller printed-circuit-board traces on circuit board 140 that connect the ASIC pins (e.g., pins associated with receiver circuits) to electrodes of touchscreen 110 (e.g., the connection may be a connector associated with interface 160).

By itself, in some cases, the hardware change in touchscreen electrode to electronic circuit connections of FIG. 11 does little good, and may be a step backward. To apply the above formulas for calculating (x,y) coordinates, much more data would need to be transferred between the two ASICs. Not only will touch C require data exchange, but touches A and B will also require data transfers between the two ASICs. Referring to logic trace (f) of the above timing diagram, a significant increase in the time interval duration between time T3 and time T4 would be needed to accommodate the greatly increased quantity of data transferred. However, the hardware change of the above figure becomes advantageous when combined with additional embodiments described below.

Note that the hardware change involves interleaving of connections between vertical electrodes and receiver circuits but not between horizontal electrodes and drive circuits. Hence, there is an asymmetry between the treatment of receiver circuits and driver circuits. This asymmetry results from the fact that receiver circuits capture mutual capacitance data in parallel, while driver circuit excitations are performed serially.

In some embodiments, the use of formulas below may eliminate the need to transfer any raw mutual capacitance data $\Delta C_M(i,j)$ between ASICs. First, the total sum of mutual capacitance signals $\Delta C_M(i,j)$ (e.g., S) may be split into odd and even partial sums as shown below. One partial sum of index i is over all odd values of i within the range $i_{MIN} \leq i \leq i_{MAX}$. The even partial sum is similarly defined. Note that while the calculation of the total sum, S, requires data measured by both ASICs, the odd partial sum, $S_{ODD}$, may be calculated by ASIC 1 without any communication with ASIC 2. Similarly, the even partial sum, $S_{EVEN}$, may be computed by ASIC 2 without any information from ASIC 1:

$$S = \sum_{i=i_{MIN}}^{i_{MAX}} \sum_{j=j_{MIN}}^{j_{MAX}} \Delta C_M(i,j) = \left\{ \sum_{i}^{ODD} \sum_{j=j_{MIN}}^{j_{MAX}} \Delta C_M(i,j) \right\} + \left\{ \sum_{i}^{EVEN} \sum_{j=j_{MIN}}^{j_{MAX}} \Delta C_M(i,j) \right\}$$

With following definitions, the above equation can be written more concisely.

$$S_{ODD} \equiv \sum_{i}^{ODD} \sum_{j=j_{MIN}}^{j_{MAX}} \Delta C_M(i, j)$$

$$S_{EVEN} \equiv \sum_{i}^{EVEN} \sum_{j=j_{MIN}}^{j_{MAX}} \Delta C_M(i, j)$$

Equation (1) below states that the total sum, S, equals the partial touch signal measured on odd numbered vertical electrodes, $S_{ODD}$, plus the partial touch signal measured on even numbered vertical electrodes, $S_{EVEN}$:

$$S = S_{ODD} + S_{EVEN} \quad \text{(Eq. 1)}$$

The math becomes more complex for the touch coordinates x and y as follows:

$$x = \sum_{i=i_{MIN}}^{i_{MAX}} \sum_{j=j_{MIN}}^{j_{MAX}} X_i \cdot \Delta C_M(i, j)/S =$$

$$\left\{ \sum_{i}^{ODD} \sum_{j=j_{MIN}}^{j_{MAX}} X_i \cdot \Delta C_M(i, j)/S \right\} + \left\{ \sum_{i}^{EVEN} \sum_{j=j_{MIN}}^{j_{MAX}} X_i \cdot \Delta C_M(i, j)/S \right\}$$

$$x = \frac{S_{ODD}}{S} \left\{ \sum_{i}^{ODD} \sum_{j=j_{MIN}}^{j_{MAX}} X_i \cdot \Delta C_M(i, j)/S_{ODD} \right\} +$$

$$\frac{S_{EVEN}}{S} \left\{ \sum_{i}^{EVEN} \sum_{j=j_{MIN}}^{j_{MAX}} X_i \cdot \Delta C_M(i, j)/S_{EVEN} \right\}$$

With the following definitions, the above equation can be written more concisely. For example, the $X_{ODD}$ coordinate estimated from signals on the odd vertical electrodes and the $X_{EVEN}$ coordinate estimated from signals on the even numbered vertical electrodes may be defined as follows (where the triple bar "≡" means equality by definition):

$$X_{ODD} \equiv \sum_{i}^{ODD} \sum_{j=MIN}^{j_{MAX}} X_i \cdot \Delta C_M(i, j)/S_{ODD}$$

$$X_{EVEN} \equiv \sum_{i}^{EVEN} \sum_{j=j_{MIN}}^{j_{MAX}} X_i \cdot \Delta C_M(i, j)/S_{EVEN}$$

The concise version of the equation states that a precise value of the touch coordinate x may be computed as a weighted sum of $X_{ODD}$ and $X_{EVEN}$, the X coordinate estimated from signals on the odd and even numbered vertical electrodes respectively:

$$x = \frac{S_{ODD}}{S} X_{ODD} + \frac{S_{EVEN}}{S} X_{EVEN} \quad \text{(Eq. 2)}$$

While $X_{ODD}$ and $X_{EVEN}$ may be poor estimates of the touch coordinate, they may be used with the above Equation 2 to provide a precise estimate of the x touch coordinate.

Odd and even estimates of Y touch coordinates may be similarly defined as follows.

$$Y_{ODD} \equiv \sum_{i}^{ODD} \sum_{j=j_{MIN}}^{j_{MAX}} Y_i \cdot \Delta C_M(i, j)/S_{ODD}$$

$$Y_{EVEN} \equiv \sum_{i}^{EVEN} \sum_{j=j_{MIN}}^{j_{MAX}} Y_j \cdot \Delta C_M(i, j)/S_{EVEN}$$

Similar as for the x coordinate, Equation 3 below states that a precise value of the touch coordinate y may be computed as a weighted sum of $Y_{ODD}$ and $Y_{EVEN}$, the y coordinate estimated from signals on the odd and even numbered vertical electrodes respectively.

$$y = \frac{S_{ODD}}{S} Y_{ODD} + \frac{S_{EVEN}}{S} Y_{EVEN} \quad \text{(Eq. 3)}$$

The definitions of $X_{ODD}$ and $Y_{ODD}$ are carefully chosen so that they may be computed entirely with information contained within ASIC 1 prior to any communication with ASIC 2. Similarly, $X_{EVEN}$ and $Y_{EVEN}$ may be computed by ASIC 2 with no information from ASIC 1.

To compute (x,y) touch coordinates using Equations 1-3 above, coarse touch coordinate data (e.g., $S_{ODD}$, $X_{ODD}$, $Y_{ODD}$, $S_{EVEN}$, $X_{EVEN}$, and $Y_{EVEN}$) may be communicated from respective ASIC 1 (e.g., touchscreen controller ASIC 120a) and ASIC 2 (touchscreen controller ASIC 120b) to synchronizing circuitry or processor (e.g., processor 150). For example, final (x,y) touchscreen coordinates may be computed and communicated by processor 150 to computing device 130 when processor 150 receives from ASIC 1 (e.g., touchscreen controller ASIC 120a) the three numerical values of $S_{ODD}$, $X_{ODD}$ and $Y_{ODD}$, and the values of $S_{EVEN}$, $X_{EVEN}$ and $Y_{EVEN}$ from ASIC2 (e.g., touchscreen controller ASIC 120b). Note that no raw mutual capacitance data $\Delta C_M(i,j)$ need be exchanged between ASICs. Rather, the exchange of coarse touch coordinate data includes much compressed high-level touch information regarding odd or even estimates of touch coordinates and odd or even signal sums from respective ASICs to a processor (e.g., processor 150) that can result in the processor determining final touchscreen coordinates to be reported to computing device 130. And, the determining process may be a linear interpolation or a weighted summation function.

In the above equations, it was implicitly assumed that the two ASICs agree to common ranges of indices $i_{MIN} \leq i \leq i_{MAX}$ and $j_{MIN} \leq j \leq j_{MAX}$ in the neighborhood of each touch before computing odd and even estimates of touch coordinates and odd and even estimates of signal sums. Recall that the vertical electrodes are represented by "i" and the horizontal electrodes are represented by "j." The implicit assumption of the common range of indices requires communication between the ASICs before odd and even touch coordinates can be computed, and is thus undesirable.

Figure 12:
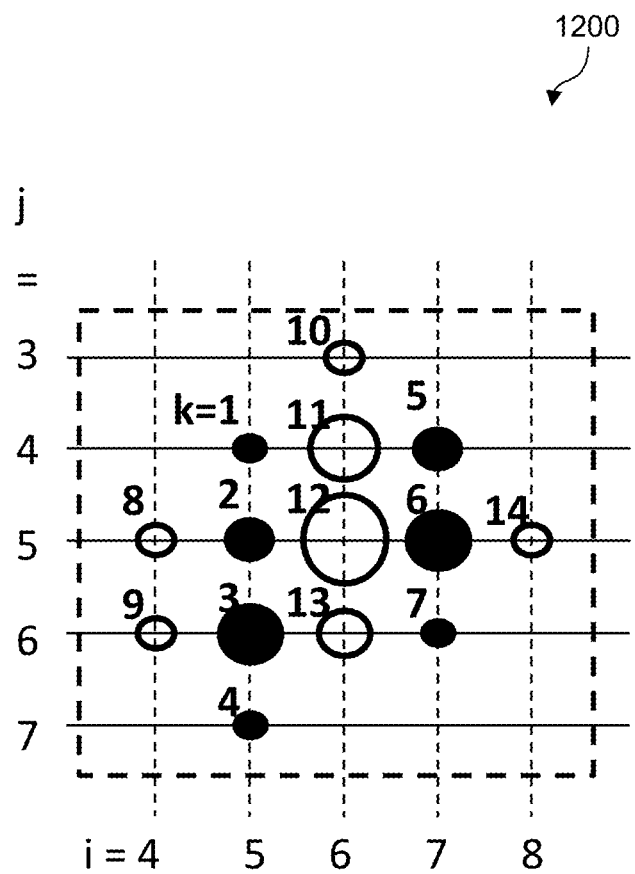
FIG. 12 illustrates a portion of a large PCAP touchscreen controlled by two touch controller ASICs with interleaved receiver connections displaying touch signal strengths, according to example embodiments of the disclosure.

Alternative to summing over a square or rectangular region of touchscreen 110 containing a touch, some embodiments include a summation determined over whatever shape the touch has, which may be irregular, for example. FIG. 12 illustrates a portion of a large PCAP touchscreen 1200 with two touch controller ASICs with interleaved receiver connections, according to example embodiments of the disclosure. For explanation purposes, FIG. 12 may be described with elements from previous figures. Within the neighborhood of a touch, index k indicates the number of intersections between vertical and horizontal electrodes where the measured mutual capacitance signal $\Delta C_M(i,j)$ satisfies a configurable threshold, such as a significant touch threshold. The significant touch threshold may be chosen to separate significant touch signals from electronic noise. In FIG. 12, solid and open circles correspond to electrode intersections with signals that satisfy the significant touch threshold (e.g., satisfy may mean greater than or greater than or equal to). Let K be the number of electrode intersections with measured mutual capacitance signals above the significant touch threshold. In the example illustrated in FIG. 12, K equals 14. Furthermore, let $K_{ODD}$ be the number of electrode intersections above threshold in which the vertical electrode number is odd. Let $K_{EVEN}$ be defined similarly so that $K=K_{ODD}+K_{EVEN}$. In the illustrated example, both $K_{ODD}$ and $K_{EVEN}$ equal seven.

In FIG. 12, signals measured on odd numbered vertical electrodes that satisfy the significant touch threshold are represented by solid circles and signals measured on even vertical electrodes by unfilled circles. As numbered in the above figure, signals for k=1, 2, 3, . . . 7 which make up $K_{ODD}$ are from odd numbered vertical electrodes and signals for $k=(K_{ODD}+1)=8, 9, 10 \ldots 14$ which make up $K_{EVEN}$ are from even numbered vertical electrodes.

Some embodiments replace the two-dimensional sum over electrode indices i and j with a single sum over k. That is, instead of summing over a square or rectangular region containing the touch, the sum is over whatever irregular shape the touch may have. For any intersection index k, that horizontal and vertical indices i and j are determined by the intersection location. In this sense, i and j are functions of index k and may be notated as i(k) and j(k). With this notation, it is possible to calculate the touch signal sum and (x,y) coordinates using the following equations involving a single sum over k, rather than two dimensional sums (e.g., double sums) over i and j.

$$S = \sum_{k=1}^{K} \Delta C_M(i(k), j(k))$$

$$x = \sum_{k=1}^{K} X_{i(k)} \cdot \Delta C_M(i(k), j(k))/S$$

$$y = \sum_{k=1}^{K} Y_{j(k)} \cdot \Delta C_M(i(k), j(k))/S$$

Similarly, the odd and even versions of coordinate estimates and partial signal sums may be redefined as follows, where the modified index k' for the alternate expressions for $X_{EVEN}$ and $Y_{EVEN}$ is defined by the equation $k'=k-K_{ODD}$.

$$S_{ODD} \equiv \sum_{k=1}^{K_{ODD}} \Delta C_M(i(k), j(k))$$

$$S_{EVEN} \equiv \sum_{k=K_{ODD}+1}^{K} \Delta C_M(i(k), j(k))$$

$$S_{EVEN} = \sum_{k'=1}^{K_{EVEN}} \Delta C_M(i(k'), j(k'))$$

$$X_{ODD} \equiv \sum_{k=1}^{K_{ODD}} X_{i(k)} \cdot \Delta C_M(i(k), j(k))/S_{ODD}$$

$$X_{EVEN} \equiv \sum_{k=K_{ODD}+1}^{K} X_{i(k)} \cdot \Delta C_M(i(k), j(k))/S_{EVEN}$$

$$X_{EVEN} = \sum_{k'=1}^{K_{EVEN}} X_{i(k')} \cdot \Delta C_M(i(k'), j(k'))/S_{EVEN}$$

$$Y_{ODD} \equiv \sum_{k=1}^{K_{ODD}} Y_{j(k)} \cdot \Delta C_M(i(k), j(k))/S_{ODD}$$

$$Y_{EVEN} \equiv \sum_{k=K_{ODD}+1}^{K} Y_{j(k)} \cdot \Delta C_M(i(k), j(k))/S_{EVEN}$$

$$Y_{EVEN} = \sum_{k'=1}^{K_{EVEN}} Y_{j(k')} \cdot \Delta C_M(i(k'), j(k'))/S_{EVEN}$$

It can be mathematically proven (but not shown here) that the above equations lead to the equations below.

$$x = \frac{S_{ODD}}{S} X_{ODD} + \frac{S_{EVEN}}{S} X_{EVEN}$$

$$y = \frac{S_{ODD}}{S} Y_{ODD} + \frac{S_{EVEN}}{S} Y_{EVEN}$$

These equations look exactly the same as equations derived above. However, there is a big difference. In some embodiments, $S_{ODD}$, $X_{ODD}$ and $Y_{ODD}$ may be computed by ASIC 1 (using the index k) over a smaller area of touchscreen 110 and still with no information from ASIC 2. Likewise, $S_{EVEN}$, $X_{EVEN}$ and $Y_{EVEN}$ may be computed (using the alternative index k') by ASIC 2 over a smaller area of touchscreen 110 and still with no information from ASIC 1.

Figure 13:
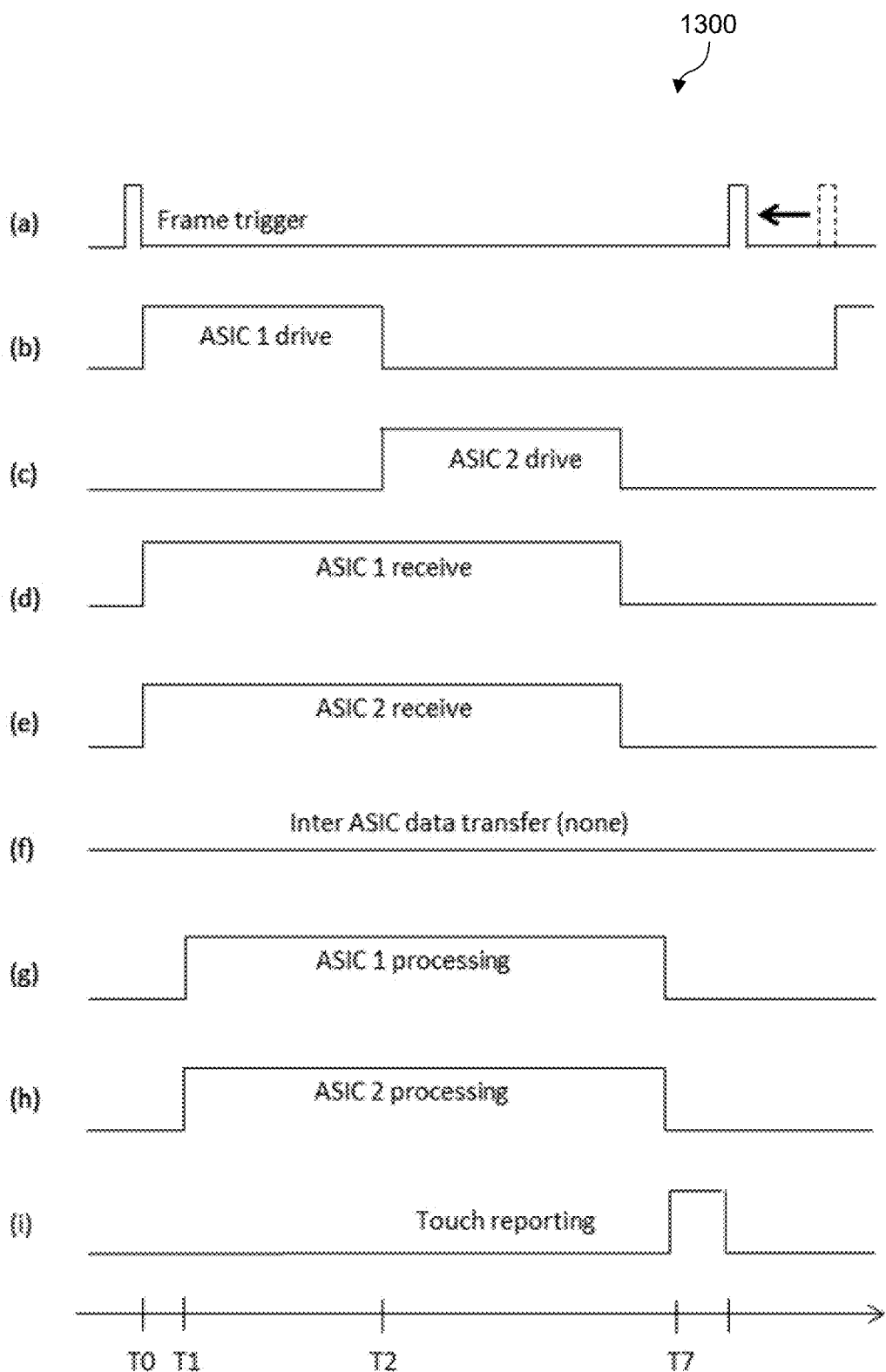
FIG. 13 illustrates a timing diagram of a large PCAP touchscreen controlled by two touch controller ASICs with interleaved receiver connections, according to example embodiments of the disclosure.

FIG. 13 illustrates a timing diagram 1300 of a large PCAP touchscreen with two touch controller ASICs with interleaved receiver connections, according to example embodiments of the disclosure. For explanation purposes, FIG. 13 may be described with elements from previous figures. FIG. 13 demonstrates the advantages of the embodiments described above. The inter-ASIC data transfer (f) of FIG. 10 has been eliminated, as it is no longer necessary. The amount of calculation to combine touch coordinate information from the two ASICs is negligible and can be included as part of the touch reporting (i) with negligible delays. This allows a faster time response as indicated by the arrow in logic trace (a), without significantly added complexity or cost, and without any added digital noise.

Figure 14:
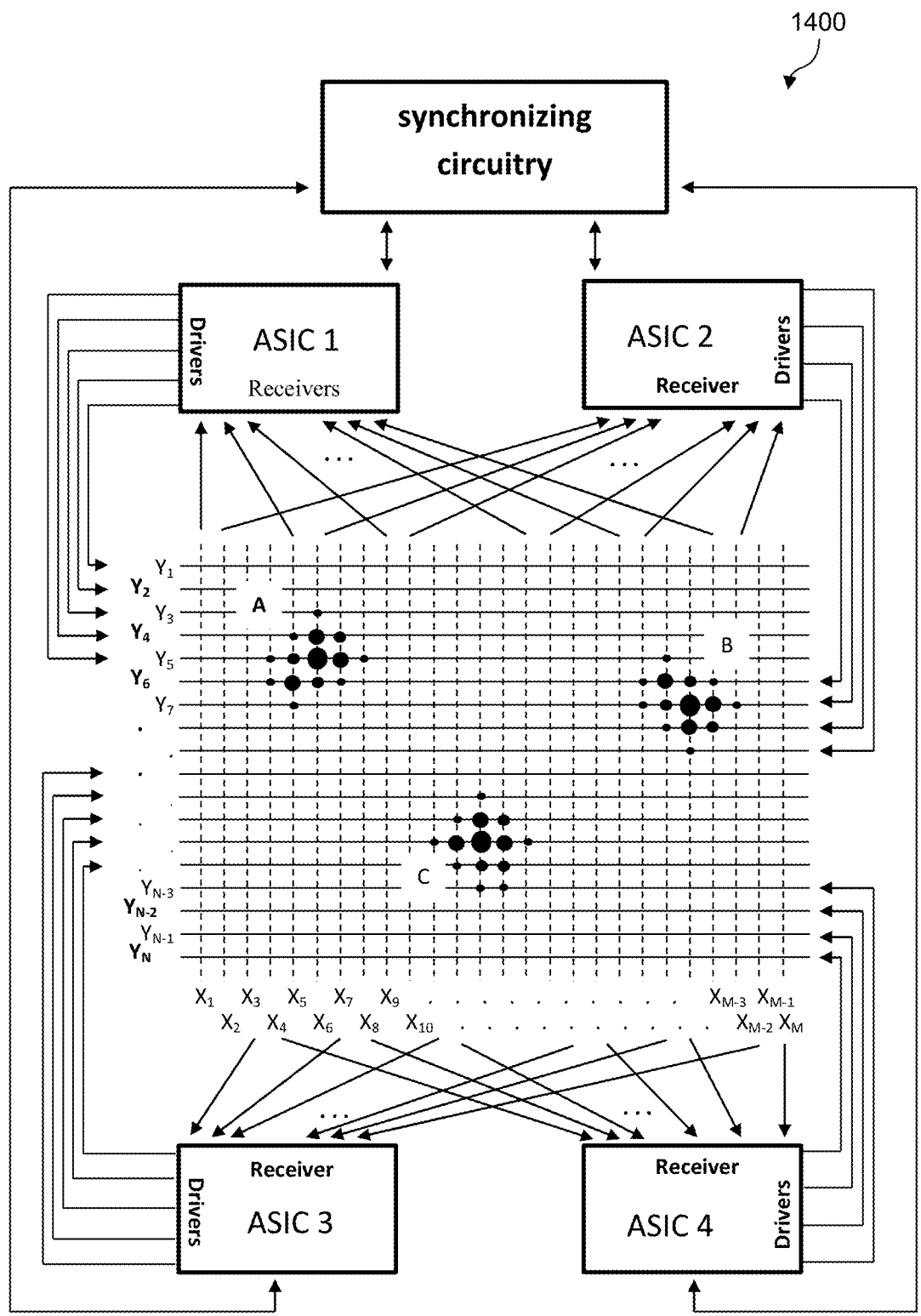
FIG. 14 illustrates a large PCAP touchscreen controlled by four touch controller ASICs with interleaved receiver connections, according to example embodiments of the disclosure.

Similar methods may be applied to touchscreen systems with three or more ASICs. FIG. 14 illustrates a large PCAP touchscreen 1400 with four touch controller ASICs with interleaved receiver connections, according to example embodiments of the disclosure. For explanation purposes, FIG. 14 may be described with elements from previous figures. The coarse touch coordinates data (e.g., high-level touch information) determined by each of the four ASICs of FIG. 14 may be combined as shown in the equations below:

$$x = \frac{S_{FIRST}}{S} X_{FIRST} + \frac{S_{SECOND}}{S} X_{SECOND} + \frac{S_{THIRD}}{S} X_{THIRD} + \frac{S_{FOURTH}}{S} X_{FOURTH}$$

-continued $$y = \frac{S_{FIRST}}{S} Y_{FIRST} + \frac{S_{SECOND}}{S} Y_{SECOND} + \frac{S_{THIRD}}{S} Y_{THIRD} + \frac{S_{FOURTH}}{S} Y_{FOURTH}$$

In the above equations, the total signal sum and ASIC partial signal sums are as follows where $K_{FIRST}$, $K_{SECOND}$, $K_{THIRD}$ and $K_{FOURTH}$ are the number of mutual capacitance signals $\Delta C_M(i,j)$ that satisfy a significant touch threshold measured by each corresponding ASIC for a touch. For the second, third and fourth ASIC signal partial sums, k'=k−$K_{FIRST}$, k"=k'−$K_{SECOND}$, and k'''=k"−$K_{THIRD}$ are the corresponding indices.

$$S = \sum_{k=1}^{K} \Delta C_M(i(k), j(k))$$

$$S_{FIRST} \equiv \sum_{k=1}^{K_{FIRST}} \Delta C_M(i(k), j(k))$$

$$S_{SECOND} \equiv \sum_{k=K_{FIRST}+1}^{K_{FIRST}+K_{SECOND}} \Delta C_M(i(k), j(k))$$

$$= \sum_{k'=1}^{K_{SECOND}} \Delta C_M(i(k'), j(k'))$$

$$S_{THIRD} \equiv \sum_{k=K_{FIRST}+K_{SECOND}+1}^{K_{FIRST}+K_{SECOND}+K_{THIRD}} \Delta C_M(i(k), j(k))$$

$$= \sum_{k''=1}^{K_{THIRD}} \Delta C_M(i(k''), j(k''))$$

$$S_{FOURTH} \equiv \sum_{k=K_{FIRST}+K_{SECOND}+K_{THIRD}+1}^{K_{FIRST}+K_{SECOND}+K_{THIRD}+K_{FOURTH}} \Delta C_M(i(k), j(k))$$

$$= \sum_{k'''=1}^{K_{FOURTH}} \Delta C_M(i(k'''), j(k'''))$$

Below are formulas for touch coordinate estimates of each ASIC:

$$X_{FIRST} = \sum_{k=1}^{K_{FIRST}} X_{i(k)} \cdot \Delta C_M(i(k), j(k)) / S_{FIRST}$$

$$Y_{FIRST} = \sum_{k=1}^{K_{FIRST}} Y_{j(k)} \cdot \Delta C_M(i(k), j(k)) / S_{FIRST}$$

$$X_{SECOND} = \sum_{k'=1}^{K_{SECOND}} X_{i(k')} \cdot \Delta C_M(i(k'), j(k')) / S_{SECOND}$$

$$Y_{SECOND} = \sum_{k'=1}^{K_{SECOND}} Y_{j(k')} \cdot \Delta C_M(i(k'), j(k')) / S_{SECOND}$$

$$X_{THIRD} = \sum_{k''=1}^{K_{THIRD}} X_{i(k'')} \cdot \Delta C_M(i(k''), j(k'')) / S_{THIRD}$$

$$Y_{THIRD} = \sum_{k''=1}^{K_{THIRD}} Y_{j(k'')} \cdot \Delta C_M(i(k''), j(k'')) / S_{THIRD}$$

$$X_{FOURTH} = \sum_{k'''=1}^{K_{FOURTH}} X_{i(k''')} \cdot \Delta C_M(i(k'''), j(k''')) / S_{FOURTH}$$

$$Y_{FOURTH} = \sum_{k'''=1}^{K_{FOURTH}} Y_{j(k''')} \cdot \Delta C_M(i(k'''), j(k''')) / S_{FOURTH}$$

With the above examples for two and four ASICs, corresponding formulas for other numbers of ASICs, such a three ASICs, may be determined.

Pitch size is the distance between two neighboring electrodes on the large PCAP touchscreen, and a common pitch size is 5 mm-7 mm. In the example of a PCAP touch system using two touch controller ASICs with interleaved connections of the receiver circuits, the coarse touch coordinate data (e.g., $S_{ODD}$, $X_{ODD}$ and $Y_{ODD}$) may be determined from an effective pitch size that is twice as large as the original pitch size of the touch screen. Accordingly, when the number of multiple ASICs used is N, each ASIC of the N ASICs processes raw touch data from a subgroup of electrodes that span the large PCAP touchscreen in the receiver dimension with a coarser pitch size than the original pitch size to produce a subset of the coarse touch coordinates data. The coarser pitch size may be equal to N*(Original_Pitch) size. Original pitch sizes less than 7.5 mm are desired in the receiver dimension for N=2, as the coarser pitch size seen by each of the N=2 ASIC's may be up to 15 mm in the receiver dimension.

The above embodiments may be applied to mixed mutual-mode and self-mode for increased water immunity as described in the Immunity Application. For the purpose of improving touch performance in the presence of water contaminants, it is useful to measure both self-capacitances and mutual capacitances. In brief, self-capacitance measurements are less susceptible to the effects of water contamination on the touch surface, while mutual-capacitance measurements provide better multiple touch performance, and mixed mode systems combine the strengths of both.

Figure 15:
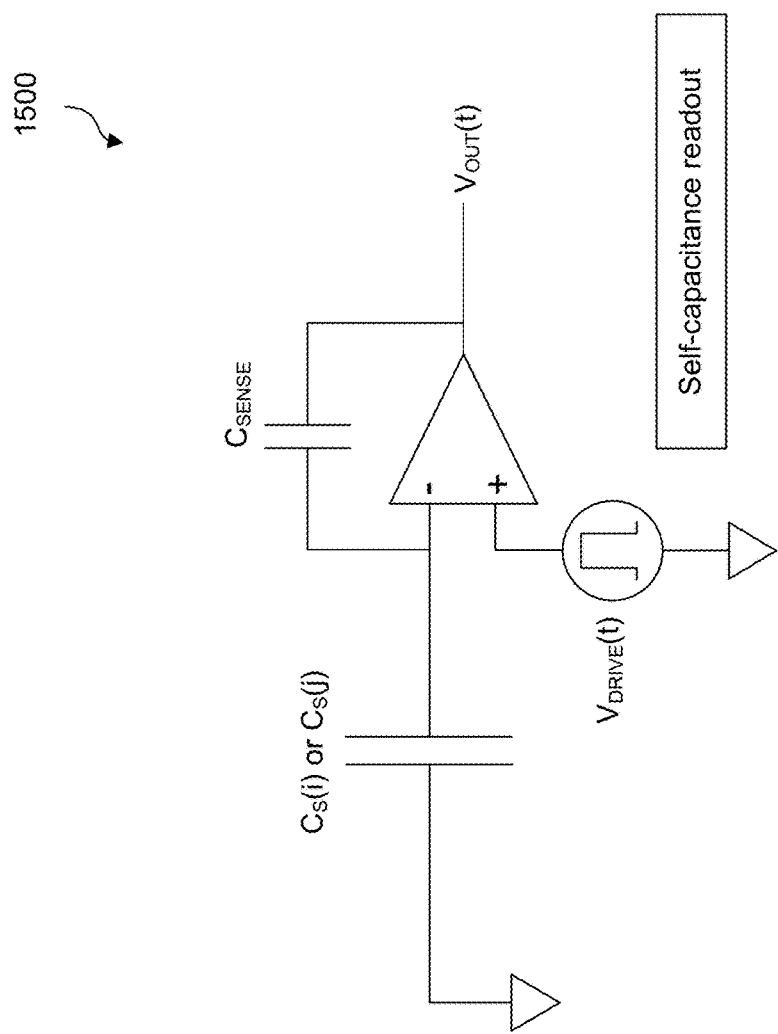
FIG. 15 illustrates a conceptual circuit for self-capacitance readout mode, according to example embodiments of the disclosure.

The nature of mutual capacitance measurements has been described above. Self capacitances $C^V_S(i)$ are associated with vertical electrodes of index i where i=1, 2, 3, . . . M and self capacitances $C^H_S(j)$ are associated with horizontal electrodes of index j where j=1, 2, 3, . . . N. FIG. 15 illustrates a conceptual circuit 1500 for self-capacitance readout mode, according to example embodiments of the disclosure. For explanation purposes, FIG. 15 may be described with elements from previous figures. A signal $V_{DRIVE}(t)$ at the positive high-gain differential amplifier input, is via feedback reproduced at the negative differential amplifier input, which in turn drives one electrode (vertical electrode i or horizontal electrode j). The ground to the left of the electrode self-capacitance $C^V_S(i)$ or $C^H_S(j)$ includes stray capacitances from the electrode to ground, as well as the grounding effect of any finger touch. A touch increases the value of $C^V_S(i)$ or $C^H_S(j)$. The charge on integrating capacitor $C_{SENSE}$ is the same as the charge on $C^V_S(i)$ or $C^H_S(j)$, and hence the signal output voltage $V_{OUT}(t)$ is proportional to the charge in $C^V_S(i)$ or $C^H_S(j)$. Note that in self-mode the excitation signal is delivered to the same electrode (i or j) that is sensed.

Figure 16:
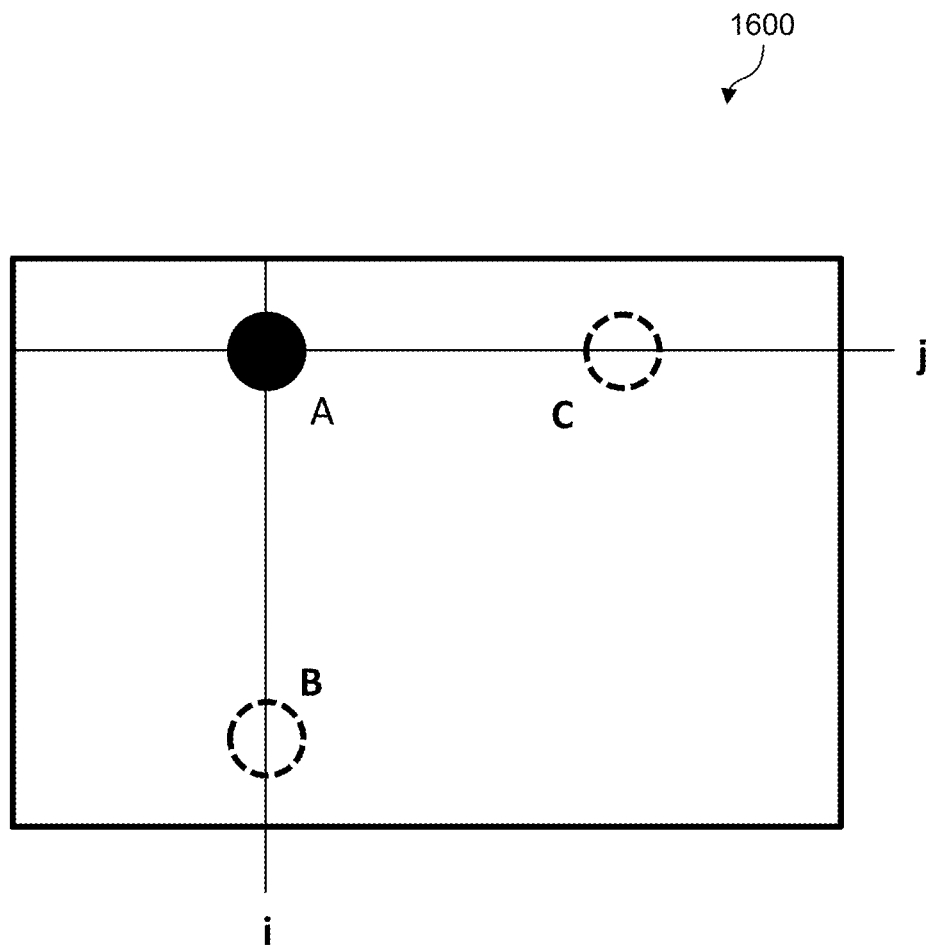
FIG. 16 illustrates an example of self-capacitance touch measurements, according to example embodiments of the disclosure.

In the determination of the location of a touch using self-capacitance measurements, the X coordinate of the touch is determined from self-capacitances $C^V_S(i)$ of vertical electrodes and the Y coordinate is determined from the self-capacitances $C^H_S(j)$ of horizontal electrodes. Hence self-capacitances $C^V_S(i)$ and $C^H_S(j)$ of both vertical and horizontal electrodes are needed to determine the two-dimensional (x,y) coordinates of a touch. FIG. 16 illustrates an example 1600 of self-capacitance touch measurements, according to example embodiments of the disclosure. To determine the location of touch A at the intersection of vertical electrode of index i and the horizontal electrode of index j, data from both vertical and horizontal electrodes is required. If data is available only from vertical electrodes, then one cannot determine if the touch is at point A, or at point B, or at some other point along vertical electrode i. Likewise, if only horizontal electrode data is available, then one cannot determine if the touch is at point A, or at point C, or at some other point along horizontal electrode j.

The next three figures analyze what self-capacitance data is available to each of two ASICs for three different interconnect options. Interleaved connections are not only advantageous for mutual-mode as described above, but also advantageous for self-mode as explained below.

Figure 17:
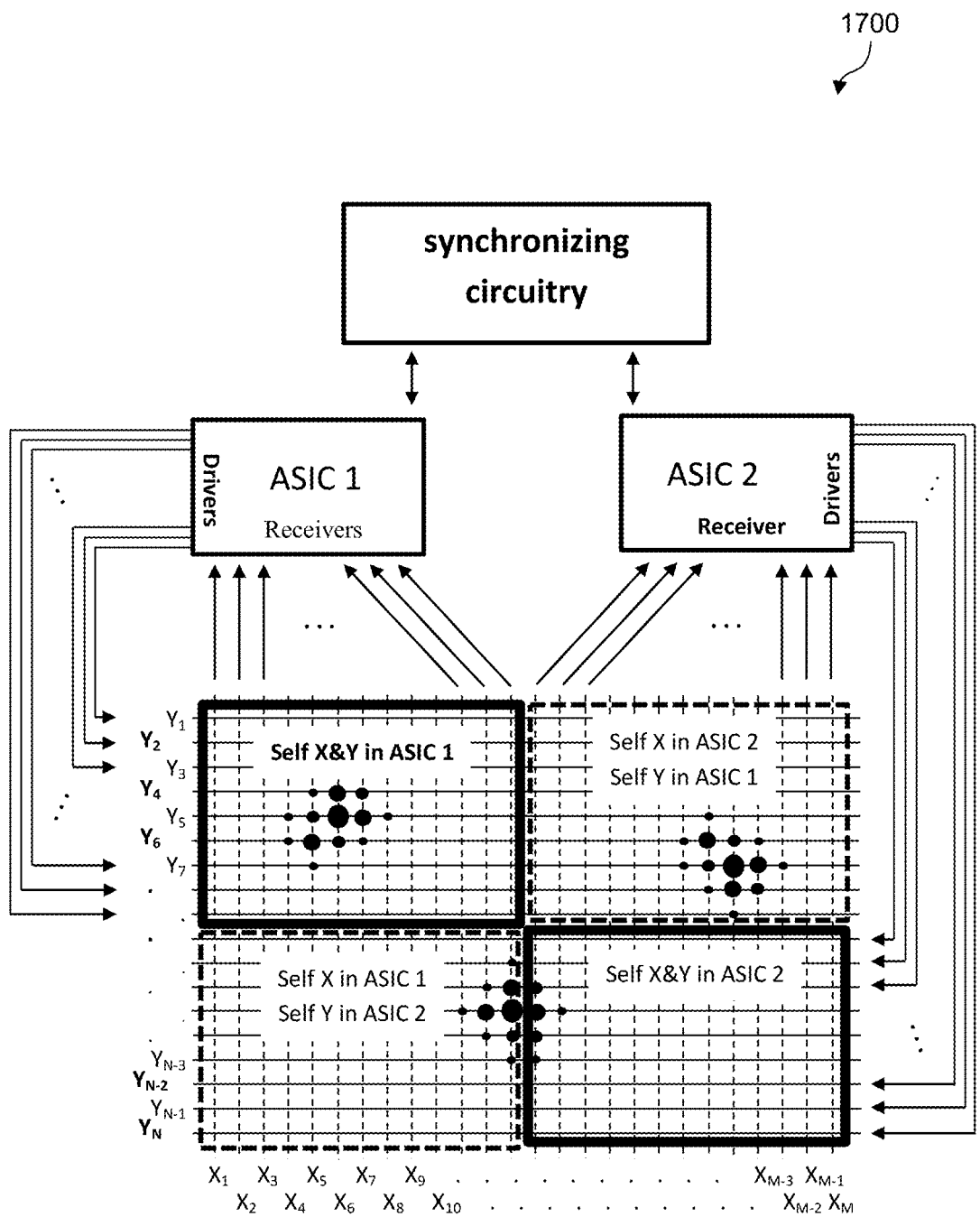
FIG. 17 illustrates challenges for water rejection algorithms with self-capacitance measurements from a large PCAP touchscreen with inter-ASIC data transfer between two touch controller ASICs.

FIG. 17 illustrates a large PCAP touchscreen 1700 with inter-ASIC data transfer between two touch controller ASICs. FIG. 17 is the same as FIG. 9, except for the solid and dashed rectangles superposed on the touchscreen area. The upper left solid rectangle corresponds to the portion of the touchscreen area for which ASIC 1 generates both vertical and horizontal self-capacitance data and hence can compute (x,y) touch coordinates from self-mode data with no data from ASIC 2. Similarly, the lower right solid rectangle outlines the touch area where ASIC 2 can determine touch coordinates with no help from ASIC 1. In these two portions of the touchscreen surface, a single ASIC can collect both mutual-mode and self-mode data and flag candidate touches, as either convincing or suspect in the presence of water contamination. However, the other two quadrants of the touch area are problematic. For the lower left quadrant, ASIC 1 only has X coordinate information for self-capacitance measurements and ASIC 2 only has Y information for self-capacitance measurements. For the upper right quadrant, ASIC 1 only has Y coordinate information for self-capacitance measurements and ASIC 2 only has X information for self-capacitance measurements. Without data exchange between ASICs, water rejection algorithms will be less effective in the lower left and upper right quadrants. With data exchange between ASICs, the above discussed disadvantages of complexity, cost and noise exist.

Figure 18:
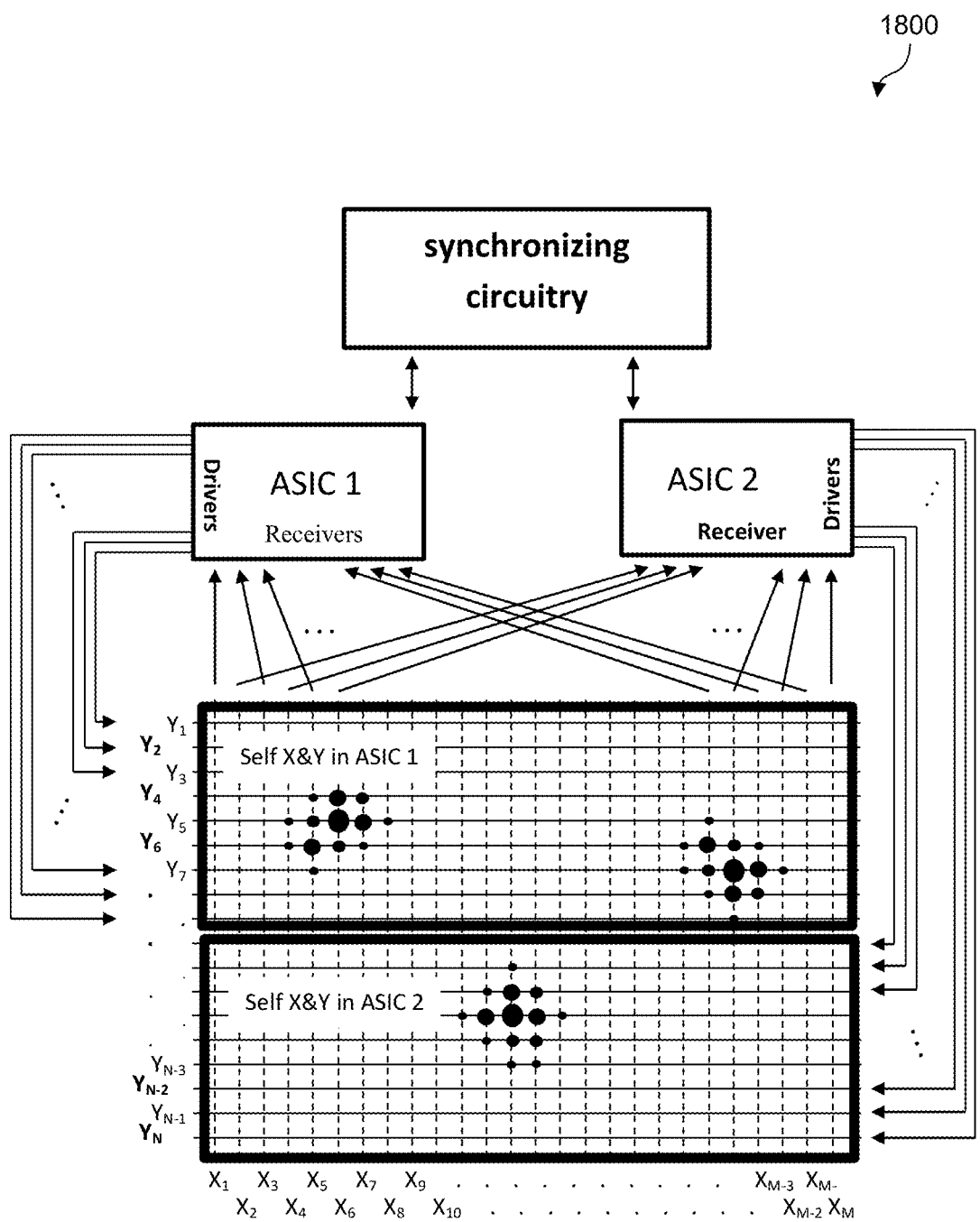
FIG. 18 illustrates challenges for a large PCAP touchscreen controlled by two touch controller ASICs with interleaved receiver connections for self-capacitance measurements, according to example embodiments of the disclosure.

FIG. 18 illustrates a large PCAP touchscreen using two touch controller ASICs with interleaved receiver connections with self capacitance measurements, according to example embodiments of the disclosure. For explanation purposes, FIG. 18 may be described with elements from previous figures. FIG. 18 is the same as FIG. 11, except for the solid rectangles superposed on the touchscreen area. The upper solid rectangle corresponds to the portion of the touchscreen area for which ASIC 1 generates both vertical and horizontal self-capacitance data (except that the measurements for vertical self-capacitance is coarse) and hence can compute (x,y) touch coordinates from self-mode data (except that X touch coordinate estimate is coarse) with no data from ASIC 2. Similarly, the lower solid rectangle outlines the touch area where ASIC 2 can determine touch coordinates with no help from ASIC 1 (except that X touch coordinate estimate is coarse). These two portions of the touchscreen surface cover the entire touch area, thus avoiding the undesirable situation above in which some areas generate only one coordinate for self-capacitance measurements in either ASIC. While each ASIC samples every-other vertical electrode, this is much preferable to missing one coordinate entirely for half the touch area. Thus, interleaved connections are advantages not only for mutual-mode, but also for self-mode.

Figure 19:
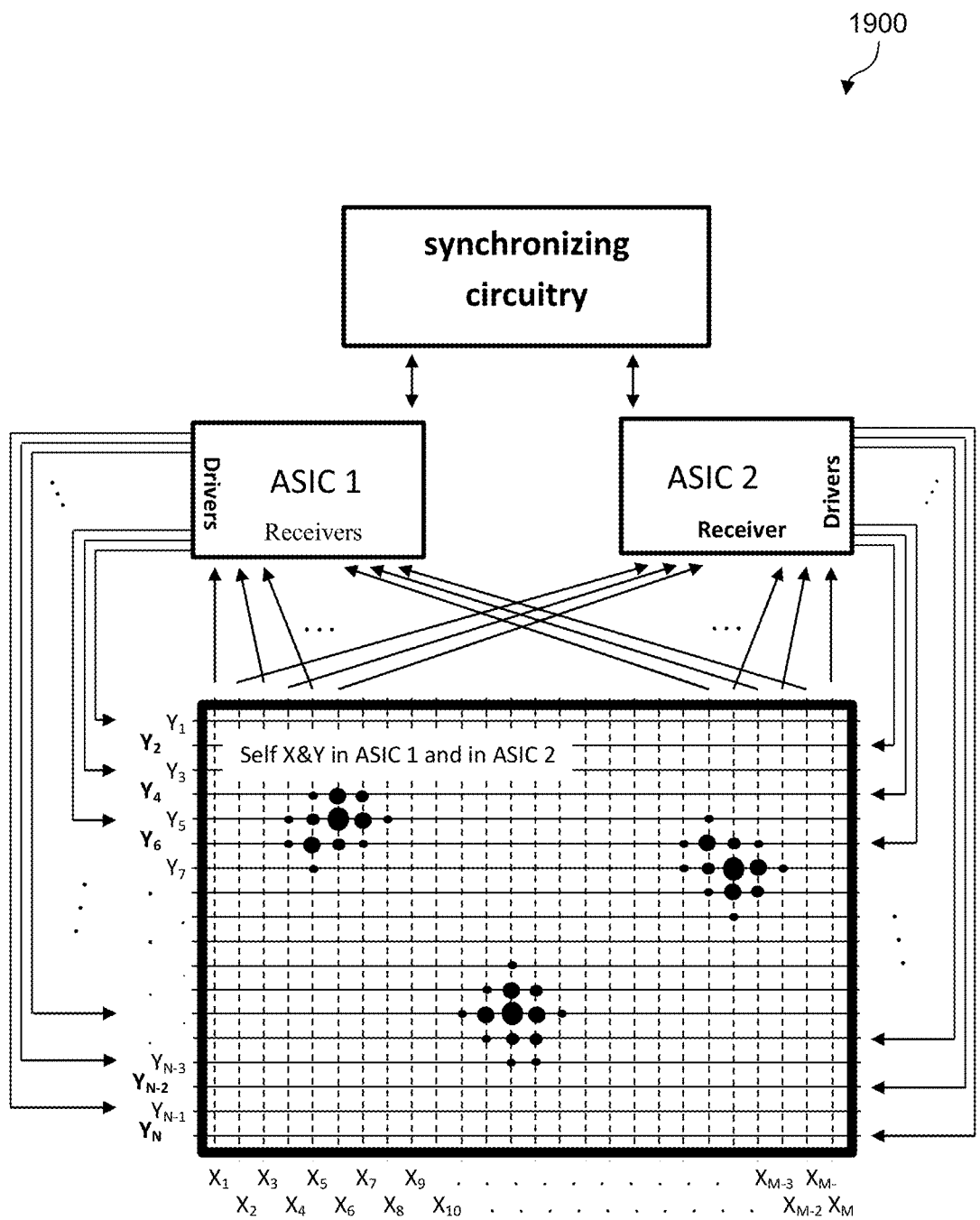
FIG. 19 illustrates a large PCAP touchscreen controlled by two touch controller ASICs with interleaved receiver connections and interleaved driver connections for self-capacitance measurements, according to example embodiments of the disclosure.

FIG. 19 illustrates a large PCAP touchscreen 1900 using two touch controller ASICs with interleaved receiver connections and interleaved driver connections, according to example embodiments of the disclosure. For explanation purposes, FIG. 19 may be described with elements from previous figures. While adding interleaving driver connections provides no advantage for mutual-mode, for self-mode, interleaved receiver connections and interleaved driver connections provide a further advantage of allowing both ASIC 1 and ASIC 2 to generate coarse X and Y self-capacitance data over the entire touch area of large PCAP touchscreen 1900.

Figure 20:
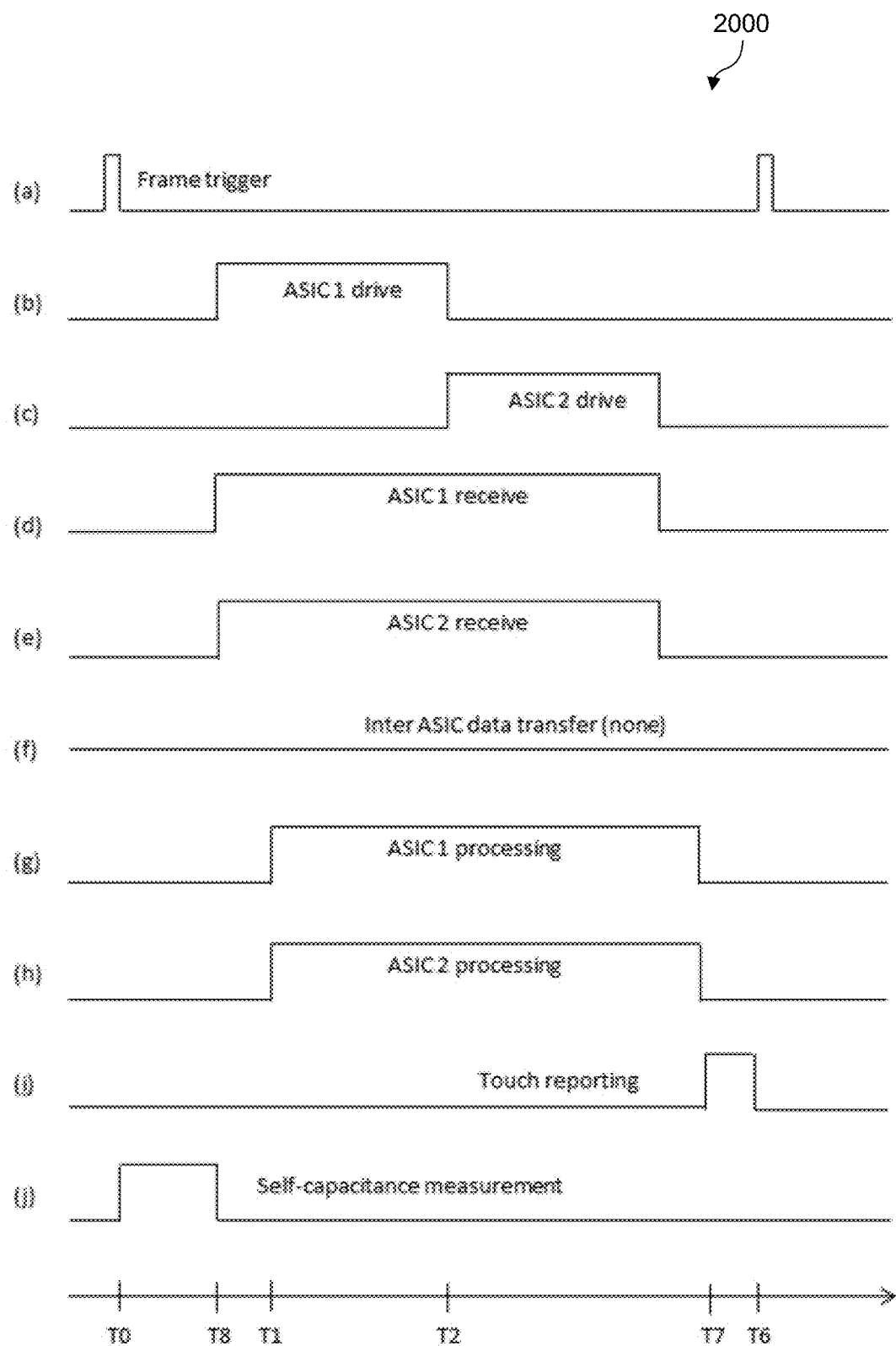
FIG. 20 illustrates a timing diagram of a large PCAP touchscreen controlled by two touch controller ASICs with interleaved receiver connections and interleaved driver connections, with self-capacitance measurements in addition to mutual-capacitance measurements, according to example embodiments of the disclosure.

FIG. 20 illustrates a timing diagram 2000 of a large PCAP touchscreen using two touch controller ASICs with interleaved receiver connections and interleaved driver connections, according to example embodiments of the disclosure. Timing diagram 2000 is similar to timing diagram 1300 for mutual-mode with interleaved receiver connections. Logic traces (a) through (i) have the same meanings as in timing diagram 1300. Timing diagram 2000 has an additional logic trace (j) with a high or logic true state between times T0 and T8. During this time self-mode measurement are made. Initiation of mutual-mode measurements are delayed from time T0 to time T8. Optionally self-mode measurements are collected at a high and low frequency as described in the Immunity Application. As shown, self-mode measurements precede mutual-mode measurements, but optionally this order may be reversed. As noted above, interleaved connections enable a reduction of the time required to make mutual-mode measurements, thus supporting mixed-mode designs by allowing more room in the timing budget for self-mode measurements.

Figure 21:
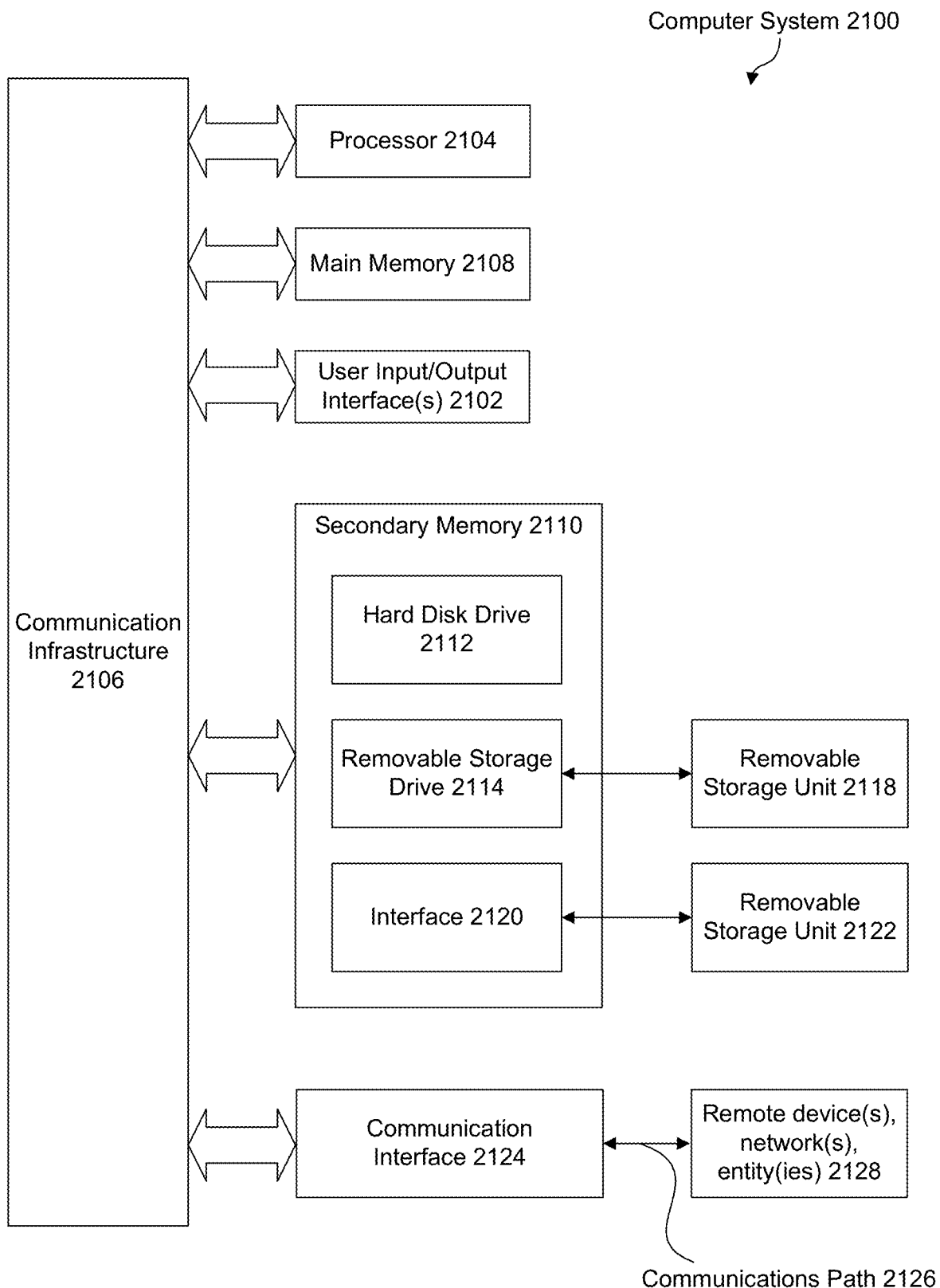
FIG. 21 is an example computer system useful for implementing various embodiments.

Various embodiments can be implemented, for example, using one or more well-known computer systems, such as computer system 2100 shown in FIG. 21. Computer system 2100 can be any well-known computer capable of performing the functions described herein such as computing device 130 and circuit board 140. Computer system 2100 may be internal or external to system 100 as discussed above.

Computer system 2100 includes one or more processors (also called central processing units, or CPUs), such as a processor 2104. Processor 2104 is connected to a communication infrastructure or bus 2106. One or more processors 2104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 2100 also includes user input/output device(s) 2102, such as monitors, keyboards, pointing devices, etc., that communicate with communication infrastructure 2106 through user input/output interface(s) 2102.

Computer system 2100 also includes a main or primary memory 2108, such as random access memory (RAM). Main memory 2108 may include one or more levels of cache. Main memory 2108 has stored therein control logic (i.e., computer software) and/or data. Computer system 2100 may also include one or more secondary storage devices or memory 2110. Secondary memory 2110 may include, for example, a hard disk drive 2112 and/or a removable storage device or drive 2114. Removable storage drive 2114 may be a floppy disk drive, a magnetic tape drive, a compact disk drive, an optical storage device, tape backup device, and/or any other storage device/drive.

Removable storage drive 2114 may interact with a removable storage unit 2118. Removable storage unit 2118 includes a computer usable or readable storage device having stored thereon computer software (control logic) and/or data. Removable storage unit 2118 may be a floppy disk, magnetic tape, compact disk, DVD, optical storage disk, and/any other computer data storage device. Removable storage drive 414 reads from and/or writes to removable storage unit 2118 in a well-known manner.

According to an exemplary embodiment, secondary memory 2110 may include other means, instrumentalities or other approaches for allowing computer programs and/or other instructions and/or data to be accessed by computer system 2100. Such means, instrumentalities or other approaches may include, for example, a removable storage unit 2122 and an interface 2120. Examples of the removable storage unit 2122 and the interface 2120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2100 may further include a communication or network interface 2124. Communication interface 2124 enables computer system 2100 to communicate and interact with any combination of remote devices, remote networks, remote entities, etc. (individually and collectively referenced by reference number 2128). For example, communication interface 2124 may allow computer system 2100 to communicate with remote devices 2128 over communications path 2126, which may be wired and/or wireless, and which may include any combination of LANs, WANs, the Internet, etc. Control logic and/or data may be transmitted to and from computer system 2100 via communication path 2126.

In an embodiment, a tangible apparatus or article of manufacture comprising a tangible computer useable or readable medium having control logic (software) stored thereon is also referred to herein as a computer program product or program storage device. This includes, but is not limited to, computer system 2100, main memory 2108, secondary memory 2110, and removable storage units 2118 and 2122, as well as tangible articles of manufacture embodying any combination of the foregoing. Such control logic, when executed by one or more data processing devices (such as computer system 2100), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 21. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A projected capacitive (PCAP) touch system comprising:
   a touchscreen; and
   a first and a second touch controller application-specific integrated circuit (ASIC) communicatively coupled to the touchscreen to detect self-capacitive touch data from touchscreen electrodes over an entire touch area of the touchscreen, wherein a first driver circuit of the first touch controller ASIC comprises first connections to a first subset of the touchscreen electrodes, wherein a second driver circuit of the second touch controller ASIC comprises second connections to a second subset of the touchscreen electrodes, wherein the first subset of the touchscreen electrodes is interleaved with the second subset of the touchscreen electrodes.

2. The PCAP touch system of claim 1, wherein the first and the second touch controller ASICs do not exchange raw self-capacitance data during a measurement frame.

3. The PCAP touch system of claim 1, wherein the first and the second touch controller ASICs generate coarse X and Y self-capacitance data over the entire touch area of the touchscreen.

4. The PCAP touch system of claim 1, further comprising one or more processors coupled to the first and the second touch controller ASICs, wherein the one or more processors are configured to: determine a final touch coordinate based on coarse touch coordinate data from the first and the second touch controller ASICs.

5. The PCAP touch system of claim 4, wherein the first subset of the touchscreen electrodes is odd numbered and the second subset of touchscreen electrodes is even numbered.

6. The PCAP touch system of claim 4, wherein first coarse touch coordinate data from the first touch controller ASIC of the coarse touch coordinate data, is based on a pitch size of the touchscreen and a sum of a number of the first and the second touch controller ASICs.

7. The PCAP touch system of claim 4, wherein the first touch controller ASIC is configured to calculate first coarse touch coordinate data comprising: a partial sum of mutual capacitance measurements satisfying a significant touch threshold across a third subset of touchscreen electrodes of the touchscreen; an X touch coordinate associated with the third subset of touchscreen electrodes; and a Y touch coordinate associated with the third subset of touchscreen electrodes, wherein the partial sum, the X touch coordinate, and the Y touch coordinate are calculated by the first touch controller ASIC without communicating with the second touch controller ASIC.

8. The PCAP touch system of claim 7, wherein third connections between the first touch controller ASIC and the third subset of touchscreen electrodes of the touchscreen, are interleaved with fourth connections, wherein the fourth connections are between the second touch controller ASIC and a fourth subset of touchscreen electrodes of the touchscreen.

9. The PCAP touch system of claim 8, wherein first coarse touch coordinate data from the first touch controller ASIC of the coarse touch coordinate data, is based at least on a number of horizontal and vertical electrode intersections of the third subset of the touchscreen electrodes whose mutual capacitance measurements satisfy the significant touch threshold.

10. The PCAP touch system of claim 9, wherein the mutual capacitance measurements are delayed until after self-capacitance measurements are made.

11. The PCAP touch system of claim 9, wherein self-capacitance measurements are delayed until after the mutual capacitance measurements are made.

12. A method, for a first touch controller application-specific integrated circuit (ASIC), comprising:
    determining a first subset of coarse touch coordinate data received from first driver circuits coupled to a first subset of touchscreen electrodes of a projected capacitive (PCAP) touchscreen, wherein the first subset of touchscreen electrodes is interleaved with a second subset of touchscreen electrodes, wherein the second subset of touchscreen electrodes is coupled to second driver circuits of a second touch controller ASIC, and wherein the first subset of touchscreen electrodes and the second subset of touchscreen electrodes together cover an entire touch area of the PCAP touchscreen; and
    transmitting the first subset of coarse touch coordinate data to a processor, wherein the processor receives a second subset of coarse touch coordinate data from the second touch controller ASIC, and wherein the processor determines final touch coordinates based on the first subset of coarse touch coordinate data and the second subset of coarse touch coordinate data.

13. The method of claim 12, wherein the first and the second touch controller ASICs do not exchange raw mutual capacitance or self-capacitance data during a measurement frame.

14. The method of claim 12, wherein the first subset of coarse touch coordinate data comprises coarse X and Y self-capacitance data.

15. The method of claim 12, wherein a coarse pitch size of the first subset of coarse touch coordinate data from the first touch controller ASIC is based on a pitch size of the PCAP touchscreen and a sum of a number of the first and the second touch controller ASICs.

16. The method of claim 12, wherein the first subset of touchscreen electrodes of the PCAP touchscreen is odd numbered and the second subset of touchscreen electrodes is even numbered.

17. The method of claim 12, wherein the first subset of coarse touch coordinate data comprises:
    a partial sum of mutual capacitance measurements satisfying a significant touch threshold across a third subset of touchscreen electrodes of the PCAP touchscreen; an X touch coordinate associated with the third subset of touchscreen electrodes; and a Y touch coordinate associated with the third subset of touchscreen electrodes, and
    wherein the determining a first subset of coarse touch coordinate data is performed without communicating with the second touch controller ASIC.

18. The method of claim 17, wherein first connections between the first touch controller ASIC and a third subset of touchscreen electrodes of the PCAP touchscreen, are interleaved with second connections, wherein the second connections are between the second touch controller ASIC and a fourth subset of touchscreen electrodes of the PCAP touchscreen.

19. The method of claim 18, wherein the first subset of touchscreen electrodes is substantially perpendicular to the third subset of touchscreen electrodes.

20. A non-transitory computer readable medium having stored therein one or more instructions that, when executed by one or more processors, cause the one or more processors of a first touch controller application-specific integrated circuit (ASIC) to perform operations, the operations comprising:
    determining a first subset of coarse touch coordinate data received from first driver circuits coupled to a first subset of touchscreen electrodes of a projected capacitive (PCAP) touchscreen, wherein the first subset of touchscreen electrodes is interleaved with a second subset of touchscreen electrodes, wherein the second subset of touchscreen electrodes is coupled to second driver circuits of a second touch controller ASIC, wherein the first subset of touchscreen electrodes and the second subset of touchscreen electrodes together cover an entire touch area of the PCAP touchscreen; and
    transmitting the first subset of coarse touch coordinate data to a processor, wherein the processor receives a second subset of coarse touch coordinate data from the second touch controller ASIC, and wherein the processor determines final touch coordinates based on the first subset of coarse touch coordinate data and the second subset of coarse touch coordinate data.

* * * * *

UNITED STATES PATENT AND TRADEMARK OFFICE
CERTIFICATE OF CORRECTION

PATENT NO. : 10,936,115 B2  
APPLICATION NO. : 16/705614  
DATED : March 2, 2021  
INVENTOR(S) : Yansun Xu Page 1 of 1

It is certified that error appears in the above-identified patent and that said Letters Patent is hereby corrected as shown below:

In the Claims

Column 25, Lines 15-16, Claim 8 replace "the touchscreen, are interleaved with fourth connections, wherein" with --the touchscreen are interleaved with fourth connections, and wherein--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*